(12) United States Patent  (10) Patent No.: US 8,810,190 B2
Kelley  (45) Date of Patent: Aug. 19, 2014

(54) MOTOR CONTROLLER SYSTEM AND METHOD FOR MAXIMIZING ENERGY SAVINGS

(75) Inventor: Paul H. Kelley, Boca Raton, FL (US)

(73) Assignee: The PowerWise Group, Inc., Boca Raton, FL (US)

( * ) Notice: Subject to any disclaimer, the term of this patent is extended or adjusted under 35 U.S.C. 154(b) by 745 days.

(21) Appl. No.: 12/207,913

(22) Filed: Sep. 10, 2008

(65) Prior Publication Data

US 2010/0117588 A9    May 13, 2010

Related U.S. Application Data

(60) Provisional application No. 61/135,402, filed on Jul. 21, 2008, provisional application No. 60/993,706, filed on Sep. 14, 2007.

(51) Int. Cl.
    *H02P 3/18* (2006.01)
    *H02P 23/00* (2006.01)
    *H02P 25/00* (2006.01)

(52) U.S. Cl.
    USPC ............................ 318/812; 318/729; 318/811

(58) Field of Classification Search
    USPC .......................................... 318/812, 729, 811
    See application file for complete search history.

(56) References Cited

U.S. PATENT DOCUMENTS

| | | |
|---|---|---|
| 2,276,353 A | 3/1942 | Vickers |
| 2,276,358 A | 3/1942 | Vickers |
| 2,345,933 A | 4/1944 | Green et al. |
| 3,440,512 A | 4/1969 | Hubby |
| 3,470,443 A | 9/1969 | Nola et al. |
| 3,470,446 A | 9/1969 | Nola et al. |
| 3,523,228 A | 8/1970 | Nola et al. |
| 3,541,361 A | 11/1970 | Nola |
| 3,582,774 A | 6/1971 | Forgacs |
| 3,671,849 A | 6/1972 | Kingston |
| 3,718,846 A | 2/1973 | Bejach |

(Continued)

FOREIGN PATENT DOCUMENTS

| | | |
|---|---|---|
| EP | 0330477 A2 | 8/1989 |
| EP | 1650860 B1 | 8/2008 |

(Continued)

OTHER PUBLICATIONS

International Search Report for International Application No. PCT/US2008/009482, dated Nov. 6, 2008 (2 pages).

(Continued)

*Primary Examiner* — Erick Glass
(74) *Attorney, Agent, or Firm* — Novak Druce Connolly Bove + Quigg LLP

(57) ABSTRACT

A motor controller (4) and method for maximizing the energy savings in an AC induction motor (3) at every load wherein the motor is calibrated at two or more load points to establish a control line (6), which is then programmed into a non-volatile memory (30) of the motor controller. A DSP-based closed-loop motor controller observes the motor parameters of the motor such as firing angle/duty cycles (23), voltage (37), current (9) and phase angles to arrive at a minimum voltage necessary to operate the motor at any load along the control line. The motor controller performs closed-loop control to keep the motor running at a computed target control point, such that maximum energy savings are realized by reducing voltage through pulse width modulation.

42 Claims, 14 Drawing Sheets

(56) References Cited

U.S. PATENT DOCUMENTS

| | | |
|---|---|---|
| 3,740,629 A | 6/1973 | Kohlhagen |
| 3,753,472 A | 8/1973 | Dwbwad et al. |
| 3,851,995 A | 12/1974 | Mills |
| 3,860,858 A | 1/1975 | Nola |
| 3,953,777 A | 4/1976 | McKee |
| 3,959,719 A | 5/1976 | Espelage |
| 3,976,987 A | 8/1976 | Anger |
| 4,039,946 A | 8/1977 | Nola |
| 4,052,648 A | 10/1977 | Nola |
| 4,096,436 A | 6/1978 | Cook et al. |
| 4,145,161 A | 3/1979 | Skinner |
| 4,168,491 A | 9/1979 | Phillips et al. |
| 4,220,440 A | 9/1980 | Taylor |
| 4,266,177 A | 5/1981 | Nola |
| 4,324,987 A | 4/1982 | Sullivan, II et al. |
| 4,333,046 A | 6/1982 | Lee |
| 4,346,339 A | 8/1982 | Lewandowski |
| 4,353,025 A | 10/1982 | Dobkin |
| 4,363,605 A | 12/1982 | Mills |
| 4,388,585 A | 6/1983 | Nola |
| 4,391,155 A | 7/1983 | Bender |
| 4,392,100 A | 7/1983 | Stanton |
| 4,400,657 A | 8/1983 | Nola |
| 4,404,511 A | 9/1983 | Nola |
| 4,412,167 A | 10/1983 | Green et al. |
| 4,413,676 A | 11/1983 | Kervin |
| 4,417,190 A | 11/1983 | Nola |
| 4,420,787 A | 12/1983 | Tibbits |
| 4,426,614 A | 1/1984 | Nola |
| 4,429,269 A | 1/1984 | Brown |
| 4,429,578 A | 2/1984 | Darrel et al. |
| 4,433,276 A | 2/1984 | Nola |
| 4,439,718 A | 3/1984 | Nola |
| 4,454,462 A | 6/1984 | Spann |
| 4,456,871 A | 6/1984 | Stich |
| 4,459,528 A | 7/1984 | Nola |
| 4,469,998 A | 9/1984 | Nola |
| 4,489,243 A | 12/1984 | Nola |
| 4,490,094 A | 12/1984 | Gibbs |
| 4,513,240 A | 4/1985 | Putman |
| 4,513,274 A | 4/1985 | Halder |
| 4,513,361 A | 4/1985 | Rensink |
| 4,551,812 A | 11/1985 | Gurr et al. |
| 4,561,299 A | 12/1985 | Orlando et al. |
| 4,616,174 A | 10/1986 | Jorgensen |
| 4,644,234 A | 2/1987 | Nola |
| 4,649,287 A | 3/1987 | Nola |
| 4,659,981 A | 4/1987 | Lumsden |
| 4,679,133 A | 7/1987 | Moscovici |
| 4,689,548 A | 8/1987 | Mechlenburg |
| 4,706,017 A | 11/1987 | Wilson |
| 4,716,357 A | 12/1987 | Cooper |
| 4,819,180 A | 4/1989 | Hedman et al. |
| 4,841,404 A | 6/1989 | Marshall |
| 4,859,926 A | 8/1989 | Wolze |
| 4,876,468 A | 10/1989 | Libert |
| 4,971,522 A | 11/1990 | Butlin |
| 4,997,346 A | 3/1991 | Bohon |
| 5,003,192 A | 3/1991 | Beigel |
| 5,010,287 A | 4/1991 | Mukai et al. |
| 5,044,888 A | 9/1991 | Hester, II |
| 5,066,896 A | 11/1991 | Bertenshaw et al. |
| 5,134,356 A | 7/1992 | El-Sharkawl et al. |
| 5,136,216 A | 8/1992 | Wills et al. |
| 5,180,970 A | 1/1993 | Ross |
| 5,202,621 A | 4/1993 | Reischer |
| 5,204,595 A | 4/1993 | Opal et al. |
| 5,214,621 A | 5/1993 | Maggelet et al. |
| 5,222,867 A | 6/1993 | Walker, Sr. |
| 5,227,735 A | 7/1993 | Lumsden |
| 5,239,255 A | 8/1993 | Schanin et al. |
| 5,259,034 A | 11/1993 | Lumsden |
| 5,281,100 A | 1/1994 | Diederich |
| 5,299,266 A | 3/1994 | Lumsden |
| 5,332,965 A | 7/1994 | Wolf et al. |
| 350,988 A | 9/1994 | Le |
| 5,350,988 A | 9/1994 | Le |
| 5,362,206 A | 11/1994 | Westerman et al. |
| 5,425,623 A | 6/1995 | London |
| 5,442,335 A | 8/1995 | Cantin et al. |
| 5,481,140 A | 1/1996 | Maruyama et al. |
| 5,481,225 A | 1/1996 | Lumsden et al. |
| 5,500,562 A | 3/1996 | Kelley |
| 5,506,484 A | 4/1996 | Munro et al. |
| 5,543,667 A | 8/1996 | Shavit et al. |
| 5,559,685 A | 9/1996 | Lauw et al. |
| 5,572,438 A | 11/1996 | Ehlers et al. |
| 5,600,549 A | 2/1997 | Cross |
| 5,602,462 A | 2/1997 | Stich |
| 5,602,689 A | 2/1997 | Kadlec et al. |
| 5,614,811 A | 3/1997 | Sagalovich et al. |
| 5,615,097 A | 3/1997 | Cross |
| 5,625,236 A | 4/1997 | Lefebvre et al. |
| 5,635,826 A | 6/1997 | Sugawara |
| 5,637,975 A | 6/1997 | Pummer et al. |
| 5,652,504 A | 7/1997 | Bangerter |
| 5,699,276 A | 12/1997 | Roos |
| 5,732,109 A | 3/1998 | Takahashi |
| 5,747,972 A | 5/1998 | Baretich et al. |
| 5,754,036 A | 5/1998 | Walker |
| 5,821,726 A | 10/1998 | Anderson |
| 5,828,200 A | 10/1998 | Ligman et al. |
| 5,828,671 A | 10/1998 | Vela et al. |
| 5,856,916 A | 1/1999 | Bennet |
| 5,880,578 A | 3/1999 | Oliveira et al. |
| 5,909,138 A | 6/1999 | Stendahl |
| 5,936,855 A | 8/1999 | Salmon |
| 5,942,895 A | 8/1999 | Popovic et al. |
| 5,945,746 A | 8/1999 | Tracewell et al. |
| 5,946,203 A | 8/1999 | Jiang et al. |
| 5,994,898 A | 11/1999 | DiMarzio et al. |
| 6,005,367 A | 12/1999 | Rohde |
| 6,013,999 A | 1/2000 | Nola et al. |
| 6,055,171 A | 4/2000 | Ishii et al. |
| 6,104,737 A | 8/2000 | Mahmoudi |
| 6,118,239 A | 9/2000 | Kadah |
| 6,178,362 B1 | 1/2001 | Woolard et al. |
| 6,184,672 B1 | 2/2001 | Berkcan |
| 6,191,568 B1 | 2/2001 | Poletti |
| 6,198,312 B1 | 3/2001 | Floyd |
| 6,225,759 B1 | 5/2001 | Bogdan et al. |
| 6,259,610 B1 | 7/2001 | Karl et al. |
| 6,265,881 B1 | 7/2001 | Meliopoulos et al. |
| 6,274,999 B1 * | 8/2001 | Fujii et al. ..................... 318/807 |
| 6,297,610 B1 | 10/2001 | Bauer et al. |
| 6,325,142 B1 | 12/2001 | Bosley et al. |
| 6,326,773 B1 | 12/2001 | Okuma et al. |
| 6,346,778 B1 | 2/2002 | Mason et al. |
| 6,351,400 B1 | 2/2002 | Lumsden |
| 6,400,098 B1 | 6/2002 | Pun |
| 6,411,155 B2 | 6/2002 | Pezzani |
| 6,414,455 B1 | 7/2002 | Watson |
| 6,414,475 B1 | 7/2002 | Dames et al. |
| 6,426,632 B1 | 7/2002 | Clunn |
| 6,449,567 B1 | 9/2002 | Desai et al. |
| 6,459,606 B1 | 10/2002 | Jadric |
| 6,483,247 B2 | 11/2002 | Edwards et al. |
| 6,486,641 B2 | 11/2002 | Scoggins et al. |
| 6,489,742 B2 * | 12/2002 | Lumsden ..................... 318/727 |
| 6,490,872 B1 | 12/2002 | Beck et al. |
| 6,495,929 B2 | 12/2002 | Bosley et al. |
| 6,528,957 B1 | 3/2003 | Luchaco |
| 6,534,947 B2 | 3/2003 | Johnson et al. |
| 6,548,988 B2 | 4/2003 | Duff, Jr. |
| 6,548,989 B2 | 4/2003 | Duff, Jr. |
| 6,553,353 B1 | 4/2003 | Littlejohn |
| 6,592,332 B1 | 7/2003 | Stoker |
| 6,599,095 B1 | 7/2003 | Takada et al. |
| 6,618,031 B1 | 9/2003 | Bohn, Jr. et al. |
| 6,643,149 B2 | 11/2003 | Arnet et al. |
| 6,650,554 B2 | 11/2003 | Darshan |
| 6,657,404 B1 | 12/2003 | Clark et al. |
| 6,662,821 B2 | 12/2003 | Jacobsen et al. |
| 6,664,771 B2 | 12/2003 | Scoggins et al. |

(56) References Cited

U.S. PATENT DOCUMENTS

| | | |
|---|---|---|
| 6,678,176 B2 | 1/2004 | Lumsden |
| 6,690,594 B2 | 2/2004 | Amarillas et al. |
| 6,690,704 B2 | 2/2004 | Fallon et al. |
| 6,718,213 B1 | 4/2004 | Enberg |
| 6,724,043 B1 | 4/2004 | Ekkanath Madathil |
| 6,747,368 B2 | 6/2004 | Jarrett, Jr. |
| 6,770,984 B2 | 8/2004 | Pai et al. |
| 6,774,610 B2 | 8/2004 | Orozco |
| 6,781,423 B1 | 8/2004 | Knoedgen |
| 6,801,022 B2 | 10/2004 | Fa |
| 6,809,678 B2 | 10/2004 | Vera et al. |
| 6,836,099 B1 | 12/2004 | Amarillas et al. |
| 6,849,834 B2 | 2/2005 | Smolenski et al. |
| 6,891,478 B2 | 5/2005 | Gardner |
| 6,912,911 B2 | 7/2005 | Oh et al. |
| 6,952,355 B2 | 10/2005 | Riggio et al. |
| 6,963,195 B1 | 11/2005 | Berkcan |
| 6,963,773 B2 | 11/2005 | Waltman et al. |
| 7,010,363 B2 | 3/2006 | Donnelly et al. |
| 7,019,474 B2 | 3/2006 | Rice et al. |
| 7,019,498 B2 | 3/2006 | Pippin et al. |
| 7,019,992 B1 | 3/2006 | Weber |
| 7,019,995 B2 | 3/2006 | Niemand et al. |
| 7,045,913 B2 | 5/2006 | Ebrahim et al. |
| 7,049,758 B2 | 5/2006 | Weyhrauch et al. |
| 7,049,976 B2 | 5/2006 | Hunt et al. |
| 7,061,189 B2 | 6/2006 | Newman, Jr. et al. |
| 7,062,361 B1 | 6/2006 | Lane |
| 7,068,184 B2 | 6/2006 | Yee et al. |
| 7,069,161 B2 | 6/2006 | Gristina et al. |
| 7,081,729 B2 | 7/2006 | Chang et al. |
| 7,091,559 B2 | 8/2006 | Fragapane et al. |
| 7,106,031 B2 | 9/2006 | Hayakawa et al. |
| 7,119,576 B1 | 10/2006 | Langhammer et al. |
| 7,123,491 B1 | 10/2006 | Kusumi |
| 7,136,724 B2 | 11/2006 | Enberg |
| 7,136,725 B1 | 11/2006 | Paciorek et al. |
| 7,157,898 B2 | 1/2007 | Hastings et al. |
| 7,164,238 B2 | 1/2007 | Kazanov et al. |
| 7,168,924 B2 | 1/2007 | Beck et al. |
| 7,188,260 B1 | 3/2007 | Shaffer et al. |
| 7,205,822 B2 | 4/2007 | Torres et al. |
| 7,211,982 B1 | 5/2007 | Chang et a |
| 7,227,330 B2 | 6/2007 | Swamy et al. |
| 7,245,100 B2 | 7/2007 | Takahashi |
| 7,250,748 B2 | 7/2007 | Hastings et al. |
| 7,256,564 B2 | 8/2007 | MacKay |
| 7,259,546 B1 | 8/2007 | Hastings et al. |
| 7,263,450 B2 | 8/2007 | Hunter |
| 7,279,860 B2 | 10/2007 | MacKay |
| 7,288,911 B2 | 10/2007 | MacKay |
| 7,298,132 B2 | 11/2007 | Woolsey et al. |
| 7,298,133 B2 | 11/2007 | Hastings et al. |
| 7,301,308 B2 | 11/2007 | Aker et al. |
| 7,309,973 B2 | 12/2007 | Garza |
| 7,330,366 B2 | 2/2008 | Lee |
| 7,336,463 B2 | 2/2008 | Russell et al. |
| 7,336,514 B2 | 2/2008 | Amarillas et al. |
| 7,349,765 B2 | 3/2008 | Reaume et al. |
| 7,355,865 B2 | 4/2008 | Royak et al. |
| 7,358,724 B2 | 4/2008 | Taylor et al. |
| 7,378,821 B2 | 5/2008 | Simpson, III |
| 7,386,713 B2 | 6/2008 | Madter et al. |
| 7,394,397 B2 | 7/2008 | Nguyen et al. |
| 7,397,212 B2 | 7/2008 | Turner |
| 7,397,225 B2 | 7/2008 | Schulz |
| 7,412,185 B2 | 8/2008 | Hall et al. |
| 7,417,410 B2 | 8/2008 | Clark, III et al. |
| 7,417,420 B2 | 8/2008 | Shuey |
| 7,436,233 B2 | 10/2008 | Yee et al. |
| 7,446,514 B1 | 11/2008 | Li et al. |
| 7,525,296 B2 | 4/2009 | Billig et al. |
| 7,528,503 B2 | 5/2009 | Rognli et al. |
| 7,561,977 B2 | 7/2009 | Horst et al. |
| 7,602,136 B2 | 10/2009 | Garza |
| 7,605,495 B2 | 10/2009 | Achart |
| 7,615,989 B2 | 11/2009 | Kojori |
| 7,622,910 B2 | 11/2009 | Kojori |
| 7,667,411 B2 | 2/2010 | Kim |
| 7,693,610 B2 | 4/2010 | Ying |
| 7,719,214 B2 | 5/2010 | Leehey |
| 7,746,003 B2 | 6/2010 | Verfuerth et al. |
| 7,768,221 B2 | 8/2010 | Boyadjieff et al. |
| 7,788,189 B2 | 8/2010 | Budike, Jr. |
| 7,791,326 B2 | 9/2010 | Dahlman et al. |
| 7,797,084 B2 | 9/2010 | Miwa |
| 7,848,897 B2 | 12/2010 | Williams, Jr. |
| 7,882,383 B2 | 2/2011 | May et al. |
| 7,902,788 B2 | 3/2011 | Garza |
| 7,911,173 B2 | 3/2011 | Boyadjieff |
| 7,919,958 B2 | 4/2011 | Oettinger et al. |
| 7,977,842 B2 | 7/2011 | Lin |
| 8,004,255 B2 | 8/2011 | Lumsden |
| 8,085,009 B2 | 12/2011 | Lumsden |
| 8,085,010 B2 | 12/2011 | Lumsden |
| 8,120,307 B2 | 2/2012 | Lumsden |
| 8,333,265 B2 | 12/2012 | Kang et al. |
| 8,374,729 B2 | 2/2013 | Chapel et al. |
| 2001/0010032 A1 | 7/2001 | Ehlers et al. |
| 2002/0071405 A1 | 6/2002 | Kelley et al. |
| 2002/0079859 A1 | 6/2002 | Lumsden |
| 2002/0109477 A1 | 8/2002 | Ikezawa |
| 2003/0090362 A1 | 5/2003 | Hardwick |
| 2003/0181288 A1 | 9/2003 | Phillippe |
| 2004/0010350 A1 | 1/2004 | Lof et al. |
| 2004/0047166 A1 | 3/2004 | Lopez-Santillana et al. |
| 2004/0095237 A1 | 5/2004 | Chen et al. |
| 2004/0153170 A1 | 8/2004 | Santacatterina et al. |
| 2004/0181698 A1 | 9/2004 | Williams |
| 2004/0189265 A1 | 9/2004 | Rice et al. |
| 2004/0239335 A1 | 12/2004 | McClelland et al. |
| 2005/0033951 A1 | 2/2005 | Madter et al. |
| 2005/0068013 A1 | 3/2005 | Scoggins |
| 2005/0073295 A1 | 4/2005 | Hastings et al. |
| 2006/0038530 A1 | 2/2006 | Holling |
| 2006/0049694 A1 | 3/2006 | Kates |
| 2006/0103365 A1 | 5/2006 | Ben-Yaacov |
| 2006/0103549 A1 | 5/2006 | Hunt et al. |
| 2006/0125422 A1 | 6/2006 | Costa |
| 2006/0175674 A1 | 8/2006 | Taylor et al. |
| 2006/0276938 A1 | 12/2006 | Miller |
| 2007/0024250 A1 | 2/2007 | Simpson, III |
| 2007/0024264 A1 | 2/2007 | Lestician |
| 2007/0037567 A1 | 2/2007 | Ungless et al. |
| 2007/0069668 A1 | 3/2007 | Mackay |
| 2007/0071047 A1 | 3/2007 | Huang et al. |
| 2007/0211400 A1 | 9/2007 | Weiher et al. |
| 2007/0213776 A1 | 9/2007 | Brink |
| 2007/0244603 A1 | 10/2007 | Level |
| 2007/0279053 A1 | 12/2007 | Taylor et al. |
| 2007/0283175 A1 | 12/2007 | Marinkovic et al. |
| 2007/0290645 A1 | 12/2007 | Boyadjieff et al. |
| 2007/0300084 A1 | 12/2007 | Goodrum et al. |
| 2007/0300085 A1 | 12/2007 | Goodrum et al. |
| 2008/0005044 A1 | 1/2008 | Benya et al. |
| 2008/0043506 A1 | 2/2008 | Ozaki et al. |
| 2008/0049452 A1 | 2/2008 | Van Bodegraven |
| 2008/0100245 A1 | 5/2008 | Turner |
| 2008/0104430 A1 | 5/2008 | Malone et al. |
| 2008/0116825 A1 | 5/2008 | Descarries et al. |
| 2008/0121448 A1 | 5/2008 | Betz et al. |
| 2008/0177678 A1 | 7/2008 | Di Martini et al. |
| 2008/0221737 A1 | 9/2008 | Josephson et al. |
| 2008/0272934 A1 | 11/2008 | Wang et al. |
| 2008/0281473 A1 | 11/2008 | Pitt |
| 2008/0290731 A1 | 11/2008 | Cassidy |
| 2008/0291607 A1 | 11/2008 | Braunstein et al. |
| 2009/0018706 A1 | 1/2009 | Wittner |
| 2009/0045804 A1 | 2/2009 | Durling et al. |
| 2009/0046490 A1 | 2/2009 | Lumsden |
| 2009/0051344 A1 | 2/2009 | Lumsden |
| 2009/0062970 A1 | 3/2009 | Forbes, Jr. et al. |
| 2009/0063228 A1 | 3/2009 | Forbes, Jr. |
| 2009/0083167 A1 | 3/2009 | Subbloie |

(56) References Cited

U.S. PATENT DOCUMENTS

| | | | |
|---|---|---|---|
| 2009/0085545 | A1 | 4/2009 | Shen et al. |
| 2009/0088907 | A1 | 4/2009 | Lewis et al. |
| 2009/0094173 | A1 | 4/2009 | Smith et al. |
| 2009/0105888 | A1 | 4/2009 | Flohr et al. |
| 2009/0154206 | A1 | 6/2009 | Fouquet et al. |
| 2009/0160267 | A1 | 6/2009 | Kates |
| 2009/0189581 | A1 | 7/2009 | Lawson et al. |
| 2009/0200981 | A1 | 8/2009 | Lumsden |
| 2010/0001704 | A1 | 1/2010 | Williams |
| 2010/0013427 | A1 | 1/2010 | Kelley |
| 2010/0014989 | A1 | 1/2010 | Tsuruta et al. |
| 2010/0033155 | A1 | 2/2010 | Lumsden |
| 2010/0054001 | A1 | 3/2010 | Dyer |
| 2010/0117588 | A9 | 5/2010 | Kelley |
| 2010/0138066 | A1 | 6/2010 | Kong |
| 2010/0145542 | A1 | 6/2010 | Chapel et al. |
| 2010/0148866 | A1 | 6/2010 | Lee et al. |
| 2010/0191385 | A1 | 7/2010 | Goodnow et al. |
| 2010/0228398 | A1 | 9/2010 | Powers et al. |
| 2010/0250590 | A1 | 9/2010 | Galvin |
| 2010/0277955 | A1 | 11/2010 | Duan |
| 2010/0283423 | A1 | 11/2010 | Boyadjieff |
| 2010/0305771 | A1 | 12/2010 | Rodgers |
| 2010/0320956 | A1 | 12/2010 | Lumsden et al. |
| 2011/0080130 | A1 | 4/2011 | Venkataraman |
| 2011/0121775 | A1 | 5/2011 | Garza |
| 2011/0182094 | A1 | 7/2011 | Lumsden et al. |
| 2012/0213645 | A1 | 8/2012 | Lumsden et al. |

FOREIGN PATENT DOCUMENTS

| | | | |
|---|---|---|---|
| EP | 2183849 | B1 | 5/2010 |
| JP | 06-261594 | | 9/1994 |
| JP | 11-007328 | A | 1/1999 |
| JP | 2011-007328 | A | 1/1999 |
| JP | 11-241687 | A | 9/1999 |
| JP | 11-241687 | A | 9/1999 |
| JP | 2001-245496 | | 9/2001 |
| JP | 2001-245496 | A | 9/2001 |
| JP | 2009535013 | A | 9/2009 |
| JP | 2010-502533 | A | 1/2010 |
| JP | 2010-502533 | A | 1/2010 |
| KR | 10-2001-0006838 | | 1/2001 |
| KR | 10-2001-0006838 | A | 1/2001 |
| KR | 10-2009-0009872 | | 1/2009 |
| KR | 10-2009-0009872 | A | 1/2009 |
| MX | 298359 | | 2/2009 |
| MX | 303414 | | 5/2010 |
| WO | WO-80/002895 | | 12/1980 |
| WO | WO-91/03093 | A1 | 3/1991 |
| WO | WO-92/16041 | A1 | 9/1992 |
| WO | WO 00-66892 | | 11/2000 |
| WO | WO 00/66892 | | 11/2000 |
| WO | WO-00-66892 | A1 | 11/2000 |
| WO | WO00/66892 | A1 | 11/2000 |
| WO | WO 2006/0021079 | A1 | 3/2006 |
| WO | WO 2008/0008745 | A2 | 1/2008 |
| WO | WO-2008-051386 | A2 | 5/2008 |
| WO | WO-2008-150458 | A1 | 12/2008 |
| WO | WO 2010/0114916 | A1 | 10/2010 |
| WO | WO2011/031603 | A1 | 3/2011 |
| WO | WO 2012/0030403 | A1 | 3/2012 |
| WO | WO 2012/0044289 | A1 | 4/2012 |
| WO | WO 2012/0050635 | A1 | 4/2012 |

OTHER PUBLICATIONS

Written Opinion of the International Search Authority for International Application No. PCT/US2008/009482, dated Nov. 6, 2008 (11 pages).
International Search Report for International Application No. PCT/US2008/009483, dated Nov. 18, 2008 (2 pages).
Written Opinion of the International Search Authority for International Application No. PCT/US2008/009483, dated Nov. 18, 2008 (6 pages).
International Search Report for International Application No. PCT/US2008/009533, dated Oct. 6, 2008 (2 pages).
Written Opinion of the International Search Authority for International Application No. PCT/US2008/009533, dated Oct. 6, 2008 (5 pages).
International Search Report for International Application No. PCT/US2008/010720, dated Nov. 25, 2008 (2 pages).
Written Opinion of the International Search Authority for International Application No. PCT/US2008/010720, dated Nov. 25, 2008 (4 pages).
International Search Report for International Application No. PCT/US2008/009393, dated Oct. 6, 2008 (3 pages).
Written Opinion of the International Search Authority for International Application No. PCT/US2008/009393, dated Oct. 6, 2008 (13 pages).
Frick, Vincent, et al., "CMOS Microsystem for AC Current Measurement with Galvanic Isolation," IEEE Sensors Journal, vol. 3, No. 6, pp. 752-760, 2003 IEEE (9 pages).
Official Action of the Eurasian Patent Office, Application No. 201070369, date Apr. 26, 2011 (2 pages).
PCT Notification of Transmittal of the International Search Report and the Written Opinion of the International Searching Authority, or the Declaration, from the International Searching Authority Korea (ISA/KR) Korean Intellectual Property Office mailed Sep. 7, 2011; corresponding to U.S. Appl. No. 12/967,128, now Publication No. US2011/0080130 A1 (our file No. 133) (9 pages).
Extended European Search Report, European Patent Office, for Application No. 108795029.1-1242/2183849 PCT/US2008009393 dated Aug. 1, 2011; corresponding U.S. Appl. No. 12/185,442, now Publication No. US2009/0046490 A1 (10 pages).
PCT Notification of Transmittal of the International Search Report and the Written Opinion of the International Searching Authority, or the Declaration, from the International Searching Authority Korea (ISA/KR) Korean Intellectual Property Office mailed Jun. 29, 2011 corresponding to U.S. Appl. No. 12/893,539 (not yet published) (our file No. 113) (8 pages).
English language translation of Japanese Patent JP-11-007328 A above (13 pages).
English language translation of Japanese Patent JP 11241687 above (16 pages).
English language translation of Japanese Patent JP 2001-245496 above (14 pages).
English language translation of Japanese Patent JP 2010-502533 A above (16 pages).
PCT Notification of Transmittal of the International Search Report and the Written Opinion of the International Searching Authority, or the Declaration, from the International Searching Authority USA (ISA/US) mailed Oct. 6, 2008; corresponding to U.S. Appl. No. 12/185,442, now Publication No. US2009/0046490 A1 (our file No. 113) (15 pages).
Frick, Vincent, Member, IEEE; Hebrard, Luc, Member, IEEE; Poure, Phillippe; Anstotz, Freddy; Braun, Francis; "CMOS Microsystem for AC Current Measurement with Galvanic Isolation"; IEEE Sensors Journal, vol. 3, No. 6, Dec. 2003; see NPL-H (our file 113) where considered a "Y" reference (9 pages).
PCT Notification Concerning Transmittal of International Preliminary Report on Patentability mailed Feb. 20, 2010 from the International Bureau of WIPO; corresponding to U.S. Appl. No. 12/185,442, now Publication No. US2009/0046490 A1 (our file No. 113) (14 pages).
PCT Notification of Transmittal of the International Search Report and the Written Opinion of the International Searching Authority, or the Declaration, from the International Searching Authority USA (ISA/US) mailed Nov. 6, 2008; corresponding to U.S. Appl. No. 12/187,136, now Publication No. US2009/0051344 A1 (our file No. 114) (15 pages).
PCT Notification of Transmittal of the International Search Report and the Written Opinion of the International Searching Authority, or the Declaration, from the International Searching Authority USA (ISA/US) mailed Nov. 18, 2008; corresponding to U.S. Appl. No. 12/187,186, now Publication No. US2009/0200981 A1 (our file No. 115) (9 pages).

(56) References Cited

OTHER PUBLICATIONS

PCT Notification of Transmittal of the International Search Report and the Written Opinion of the International Searching Authority, or the Declaration, from the International Searching Authority USA (ISA/US) mailed Oct. 6, 2008; corresponding to U.S. Appl. No. 12/187,805, now Publication No. US2010/0033155 A1 (our file No. 116) (7 pages).
PCT Notification Concerning Transmittal of International Preliminary Report on Patentability mailed Feb. 17, 2011 from the International Bureau of WIPO; International Application No. PCT/US2008/009533 corresponding to U.S. Appl. No. 12/187,805, now Publication No. US2010/0033155 A1 (our file No. 116) (6 pages).
PCT Notification of Transmittal of the International Search Report and the Written Opinion of the International Searching Authority, or the Declaration, from the International Searching Authority USA (ISA/US) mailed Nov. 25, 2008; corresponding to International Application No. PCT/US 08/10720 and U.S. Appl. No. 12/207,913, now Publication No. US2010/0013427 A1 (our file No. 117) (8 pages).
PCT Notification Concerning Transmittal of International Preliminary Report on Patentability mailed Mar. 25, 2010 from the International Bureau of WIPO; corresponding to International Application No. PCT/US2008/1010720 and U.S. Appl. No. 12/207,913, now Publication No. US2010/0013427 A1 (our file No. 117) (7 pages).
English language translation of Offcial Action from the Eurasian Patenet Office pertaining to Application No. 201070369/(OFE/1004/0111) and original Office Action both corresponding to PCT Application No. US 2008/010720 dated Apr. 26, 2011 and U.S. Appl. No. 12/207,913, now Publication No. US2010/0013427 A1 (our file No. 117) (2 pages).
PCT Notification of Transmittal of The International Search Report and the Written Opinion of the International Searching Authority, or the Declaration, from the International Searching Authority USA (ISA/US), mailed Oct. 15, 2010; corresponding to U.S. Appl. No. 12/873,510, now Publication No. US2010/0320956 A1 (our file No. 123) (11 pages).
International Search Report and Written Opinion for International Application No. PCT/US2012/035844 dated Nov. 16, 2012 corresponding to US2012/0213645 A1 (our matter 135) (8 pages).
First Non-Final Office Action mailed Feb. 3, 2011, U.S. Appl. No. 12/187,186, filed Aug. 6, 2008, (19 pages).
Response and Amendment to First Non-Final Office Action mailed Apr. 8, 2011, U.S. Appl. No. 12/187,186, filed Aug. 6, 2008, (32 pages).
Final Office Action mailed Jun. 13, 2011, U.S. Appl. No. 12/187,186, filed Aug. 6, 2008, (23 pages).
Notification of the First Office Action dated Dec. 23, 2011, State Intellectual Property Office of People's Republic of China; Chinese National Phase of PCT Application No. 200880111387.0, with English translation (19 pages).
Response to NPL PP above dated Jan. 13, 2012 adding new claims of U.S. Appl. No. 13/331,757 (16 pages).
Response and Amendment to Aug. 3, 2011 Non-Final Office Action filed Oct. 31, 2011, U.S. Appl. No. 12/207,913 (23 pages).
Final Office Action in U.S. Appl. No. 12/207,913 mailed from the USPTO on Mar. 14, 2012 relying on US 6,274,999 to Fuji and US 6,489,742 to Lumsden (17 pages).
Extended European Search Report from the European Patent Office in Application No. 08830045.4 dated Aug. 22, 2012 (8 pages).
Notice of Reasons for Refusal of Patent Application No. 2010-524881 mailed from the Japanese Patent Office on Aug. 28, 2012 relying on Japanese Unexamined Patent Publication HEI6-261594 with English translation (6 pages).
Response to final Office Action of NPL 3A for U.S. Appl. No. 12/207,913, filed with the USPTO on Sep. 13, 2012 (32 pages).
Sul, S K and Park, M H: "A novel Technique for Optimal Efficiency Control of a Current-Source Inverter-Fed Induction Motor", IEEE Transactions on Power Electronics, vol. 3, No. 2, Apr. 1, 1988, pp. 192-199, XP002063874, ISSN: 0885-8993, DOI: 10.1109/63.4349, p. 2, left-hand column, line 9—p. 4, left-hand column, line 29; Figs. 4-8 (8 pages); clean copy retrieved from IEEE databank attached, considered to be particularly relevant if taken alone, see NPL 3B (8 pages).
Flemming Abraham Sen, et al.: "On the Energy Optimized Control of Standard and High-Efficiency Induction Motors in CT and HVAC Applications", IEEE Transactions on Industry Applications, IEEE Service Center, Piscataway, NJ, US, vol. 34, No. 4, Aug. 1, 1998, XP011022398, ISSN: 0093-9994, p. 4, right-hand column, line 11—p. 5, left-hand column, line 5; Fig. 9 (10 pages); ); clean copy retrieved from IEEE databank attached, considered to be particularly relevant if taken alone, see NPL 3B (10 pages).
Office Action issued by the State Intellectual Property Office (SIPO) on Apr. 28, 2012 for Chinese Application No. 200880115946 (PCT/US2008/010720) relying on US 6,274,999 B1 to Fuji, with English translation (21 pages).
Office Action issued by the Colombian Patent Office in Application No. 10.042.683 (PCT/US2008/010720) relying on US 6,274,999 B1 to Fuji and US 6,489,742 to Lumsden, with English translation (24 pages).
Office Action from Eurasian Patent Office dated Aug. 16, 2012 signed by Official Patent Examiner A.M. Komarov for Application No. 201070369/31 with English translation (4 pages).
European Patent Office grant of patent dated Jun. 4, 2012, European Patent Application No. 08795029.1-1242 (61 pages).
Response to NPL 3J above requesting deletion of text added to claims 1 and 10 by Examiner dated Sep. 19, 2012, European Patent Application No. 08795029.1-1242 (2 pages).
Office Action from the Eurasian Patent Office dated May 28, 2012, signed by Official Patent Examiner A.M, Komarov, Eurasian Patent Application No. 201070276/31 (English translation, 2 pages).
Industry and Commerce Superintendency, Republic of Colombia, Resolution No. 71361, denying the Colombian patent application corresponding to US2010/0117588 (U.S. Appl. No. 12/207,913) (our matter 117), dated Nov. 26, 2012, executed by Pablo Felipe Robledo Del Castillo (6 pages), with English translation (6 pages) (Total 12 pages).
Patent Cooperation Treaty Notification Concerning Transmittal of International Preliminary Report on Patentability (Chapter 1 of the Patent Cooperation Treaty) (PCT Rule 44bis.1(c) mailed Mar. 14, 2013 for PCT Application corresponding to International Application No. PCT/US2011/020326, filed on Jan. 6, 2011, and published as WO2012/030403 on Mar. 2, 2012, corresponding to U.S. Appl. No. 12/967,128 published as US-2011/0080130 A1 (our matter 0133) (6 pages).
Office Action from the U.S. Patent and Trademark Office mailed Feb. 22, 2013 corresponding to U.S. Appl. No. 12/207,913, republished as US-2010/0117588 A1 (our matter 0017US) (48 pages).
Office Action from the U.S. Patent and Trademark Office mailed Mar. 29, 2013 for Chinese Application No. 200880115946.5 with English translation corresponding to U.S. Appl. No. 12/207,913, republished as US-2010/0117588 A1 (19 pages).
Response to Office Action from the State Intellectual Property Office dated Mar. 29, 2013 (NPL 3R) for Chinese Application No. 200880115946.5 corresponding to U.S. Appl. No. 12/207,913, republished as US-2010/0117588 A1 (13 pages).
Notice of Allowance form the U.S Patent and Trademark Office mailed Jun. 11, 2013 for U.S. Appl. No. 13/451,041, published as US-2012/0213645 A1 (our matter 0135US) (49 pages)
Response to Office Action from the Colombian Patent Office dated Dec. 27, 2012 for Colombian Application No. 10.042.683 with English translation corresponding to U.S. Appl. No. 12/207,913, republished as US-2010/0117588 A1 (55 pages).
Response to Office Action from Eurasian Patent Office dated Dec. 17, 2012 for Application No. 201070369/31 corresponding to U.S. Appl. No. 12/207,913, republished as US-2010/0117588 A1 (15 pages).
Notification of the necessity to Submit Additional Materials from the Eurasian Patent Office dated Apr. 1, 2013 for Application No. 201070369/31 with English translation corresponding to U.S. Appl. No. 12/207,913, republished US-2010/0117588 A1 (4 pages).
Response to Supplementary European Search Report from the European Patent Office mailed on Aug. 22, 2012 filed on Mar. 18, 2013

(56) References Cited

OTHER PUBLICATIONS regarding European Application No. 08830045.4 corresponding to U.S. Appl. No. 12/207,913, republished as US-2010-0117588 A1 (21 pages).

Notice of Reasons for Refusal of Patent Application No. 2010-524881 mailed from the Japanese Patent Office on Aug. 28, 2012 with English translation, relying on Japanese Unexamined Patent Publication HEI6-261594; See NPL 4R (6 pages).

Response to 2 $^{nd}$ Office Action for Chinese Patent Application No. 200880111387.0 filed on Jan. 8, 2013 corresponding to U.S. Appl. No. 12/185,442, issued as US Patent No. 8085009B2 (25 pages).

Voluntary Amendment filed on Mar. 21, 2013 for Chinese Patent Application No. 200880111387.0 filed on Jan. 8, 2013 corresponding to U.S. Appl. No. 12/185,442, issued as US Patent Number 8085009B2 (22 pages).

Notification on Grant of Patent Right for Invention mailed on Apr. 9, 2013 for Chinese Patent Application No. 200880111387.0 filed on Jan. 8, 2013 with English translation corresponding to U.S. Appl. No. 12/185,442, issued as US Patent No. 8085009132 (4 pages).

Response to Office Action for Colombian Patent Application No. 10.029.658 filed on Feb. 20, 2013 corresponding to U.S. Appl. No. 12/185,442, issued as US Patent No. 8085009B2 (42 pages).

Office Action from the U.S. Patent and Trademark Office mailed Mar. 13, 2013 corresponding to U.S. Appl. No. 12/873,510, published as US-2010/0320956 A1 on Dec. 23, 2010, which is a continuation-in-part of U.S. Appl. No. 12/207,913, republished as US-2010/0117588 A1 (15 pages).

International Search Report for International Application No. PCT/US2010/047477 mailed Mar. 22, 2012 corresponding to U.S. Appl. No. 12/873,510, published as US-2010/0320956 A1 (9 pages).

Voluntary Amendment filed on Nov. 9, 2012 for Chinese Patent Application No. 201080039849.X corresponding to U.S. Appl. No. 12/873,510, republished as US-2010/0320956 A1 (8 pages).

Office Action from U.S. Patent and Trademark Office mailed Feb. 26, 2013 corresponding to U.S. Appl. No. 12/893,539, published as US-2012/0075896 A1 (7 pages).

International Search Report for International Application No. PCT/US2010/050714 mailed Apr. 11, 2013 corresponding to U.S. Appl. No. 12/893,539, published as US-2012/0075896 A1 (5 pages).

Office Action from the U.S. Patent and Trademark Office mailed Apr. 10, 2013 corresponding to U.S. Appl. No. 13/026,931 (11 pages).

Notice of Allowance from the U.S. Patent and Trademark Office mailed Julie 11, 2013 corresponding to U.S. Appl. No. 12/967,128 (11 pages).

Office Action from the U.S. Patent and Trademark Office mailed Aug. 17, 2012 corresponding to U.S. Appl. No. 13/331,757 (14 pages).

Response to Office Action from the U.S, Patent and Trademark Office mailed Aug. 17, 2012, filed on Nov. 15, 2012 corresponding to U.S. Appl. No. 13/331,757 (26 pages).

Final Office Action from the U.S. Patent and Trademark Office mailed Feb. 27, 2013 corresponding to U.S. Appl. No. 13/331,757 (45 pages).

Response to Office Action from the Eurasian Patent Office filed on Apr. 19, 2013 corresponding to U.S. Appl. No, 13/331,757 (13 pages).

Sul, S K and Park, M H; "A novel Technique for Optimal Efficiency Control of a Current-Source Inverter-Fed Induction Motor", IEEE Transactions on Power Electronics, vol. 3, No. 2, Apr. 1, 1988, pp. 192-199, XP002083874, ISSN: 0885-8993, DOI: 10.1109/63.4349, p. 2, left-hand column, line 9—p. 4, left-hand column, line 29; Figs. 4-8 (8 pages); clean copy retrieved from IEEE databank attached, considered to be particularly relevant if taken alone, see NPL 3X (16 pages).

Flemming Abrahamsen, et al.: "On the Energy Optimized Control of Standard and High-Efficiency Induction Motors in CT and HVAC Applications", IEEE Transactions on Industry Applications, IEEE Service Center, Piscataway, NJ, US, vol. 34, No. 4, Jul./Aug. 1998, XP011022398, ISSN: 0093-9994, p. 4, right-hand column, line 11—p. 5, left-hand column, line 5; Fig. 9 (10 pages): ); clean copy retrieved from IEEE databank attached, considered to be particularly relevant if taken alone, see NPL 3X (20 pages).

International Search Report for International Application No. PCT/US2011/032840, mailed Apr. 11, 2013 corresponding to U.S. Appl. No. 13/026,931, published as US 2011-0182094 A1 (6 pages).

English language Abstract and English language translation of Japanese Unexamined Patent Publication HEI6-261594; See NPL 3Y (9 pages).

\* cited by examiner

MOTOR CONTROLLER SYSTEM AND METHOD FOR MAXIMIZING ENERGY SAVINGS

CROSS REFERENCE TO RELATED APPLICATION

This application claims the benefit of U.S. Provisional Application Nos. 60/993,706 filed Sep. 14, 2007; and 61/135,402 filed Jul. 21, 2008.

BACKGROUND OF THE INVENTION

This invention relates to a system and method for maximizing the energy savings in AC induction motors at every load, more particularly one that uses a digital signal processor that calibrates control lines to determine the most efficient operational characteristics of the motors.

In prior systems and methods related to energy saving motor controllers using control lines of a motor, constant phase angle and/or constant power factor control were used to determine the control lines. This meant that the control lines were horizontal and the motor controllers were not able to control the motor to specific calibrated operating point at every load to maximize energy savings.

Thus, a need exists for a method and system for AC induction motors which controls the motor to a specific calibrated operating point at every load. Operating points taken across all loads will define a control line or a control curve. Furthermore, a need exists for a method and system for AC induction motors which is capable of recognizing when a motor begins to slip and is about to stall and uses that information to determine calibrated control line so as to maximize energy savings at every load.

The relevant patents of prior art includes the following references:

| Patent/Ser. No. | Inventor | Issue/Publication Date |
| --- | --- | --- |
| 2008/0100245 | Turner | May 01, 2008 |
| 7,288,911 | MacKay | Oct. 30, 2007 |
| 7,279,860 | MacKay | Oct. 09, 2007 |
| 7,256,564 | MacKay | Aug. 14, 2007 |
| 7,211,982 | Chang et al. | May 01, 2007 |
| 7,081,729 | Chang et al. | Jul. 25, 2006 |
| 6,643,149 | Arnet et al. | Nov. 04, 2003 |
| 6,489,742 | Lumsden | Dec. 03, 2002 |
| 5,506,484 | Munro et al. | Apr. 09, 1996 |
| 5,350,988 | Le | Sep. 27, 1994 |

SUMMARY OF THE INVENTION

The primary object of the present invention is to provide a system and method of maximizing energy savings in AC induction motors at every load.

Another object of the present invention is to provide a system and method which recognizes when a motor begins to slip and when the motor is about to stall.

A further object of the present invention is to provide a system and method which controls the motor to a specific calibrated operating point at every load.

Another object of the present invention is to provide a motor controller that is capable of observing the operational characteristics of AC induction motors.

A further object of the present invention is to provide a motor controller capable of making corrections to the RMS motor voltage as an AC induction motor is running and under closed loop control.

Another object of the present invention is to provide a motor controller capable of responding to changes in the load of an AC induction motor in real-time.

The present invention fulfills the above and other objects by providing a motor controller system and method for maximizing the energy savings in the motor at every load wherein a motor is calibrated at one or more load points, establishing a control line or curve, which is then programmed into a non-volatile memory of the motor controller. A digital signal processor (DSP) a part of a closed loop architecture of the motor controller possesses the capability to observe the motor parameters such as current, phase angles and motor voltage. This DSP based motor controller is further capable of controlling the firing angle/duty cycle in open-loop mode as part of a semi-automatic calibration procedure. In normal operation, the DSP based motor controller performs closed-loop control to keep the motor running at a computed target control point, such that maximum energy savings are realized. The method described here works equally well for single phase and three phase motors.

The preferred implementation of this method uses a DSP to sample the current and voltage in a motor at discrete times by utilizing analog to digital converters. From these signals, the DSP can compute key motor parameters, including RMS motor voltage, RMS current and phase angle. Furthermore, the DSP based motor controller can use timers and pulse width modulation (PWM) techniques to precisely control the RMS motor voltage. Typically the PWM is accomplished by using power control devices such as TRIACs, SCRs, IGBTs and MOSFETs.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
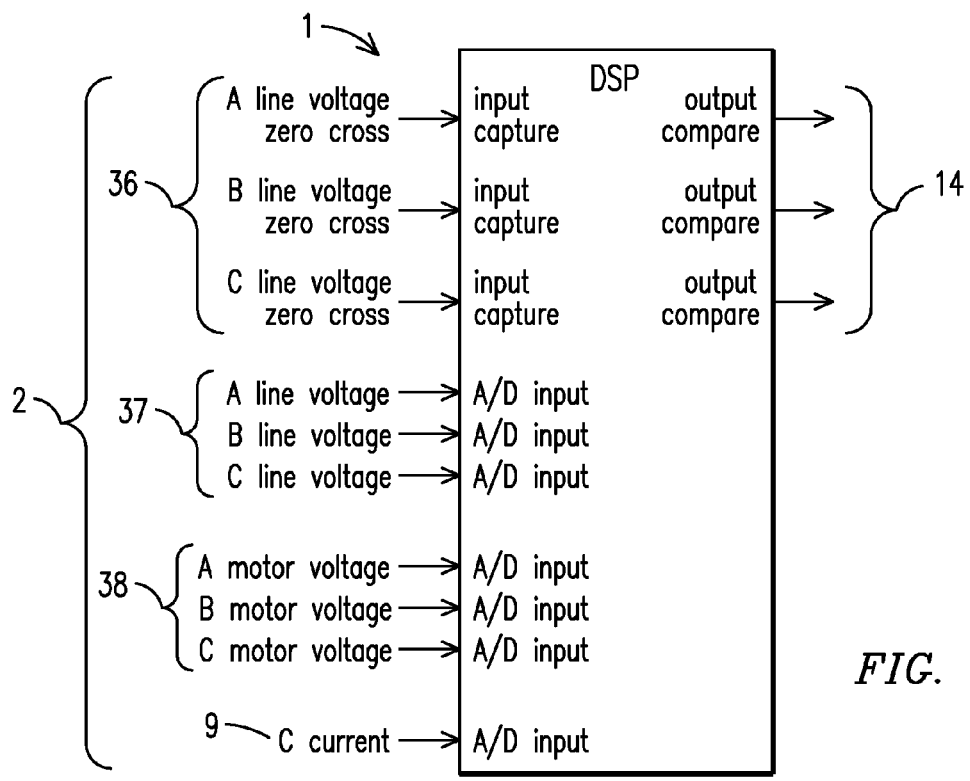
FIG. 1 is a block diagram of a digital signal processor (DSP) with hardware inputs and outputs of the present invention showing hardware inputs and outputs.

For purposes of describing the preferred embodiment, the terminology used in reference to the numbered components in the drawings is as follows:
1. digital system processor (DSP)
2. hardware inputs
3. motor
4. motor controller
5. observed phase angle
6. control line
7. observed calibration data curve from sweep of conlrol space
8. supply divider resistors
9. current
10. target phase angle
11. phase error signal
12. proportional integral derivative (PID) controller
13. root square mean (RMS) motor voltage
14. power control device outputs
15. phase A line voltage zero crossing
16. phase B line voltage zero crossing
17. phase C line voltage zero crossing
18. positive phase rotation
19. negative phase rotation
20. powcr-on-rcsct (POR)
21. stall point
22. a.c.b phase turn on times
23. firing angle/duty cycle
24. percent load
25. paramctrical control line
26. operating point
27. low output impedance amplifier
28. phase error
29. control voltage
30. point b
31. knee
32. calibration bullon
33. power control device
34. point c
35. voltage minimum (Vmin)
36. phase zero crossing inputs
37. phase line voltage
38. phase motor voltage
39. lime is measured
40. is time greater or less than 90°
41. ABC rotation
42. ACB rotation
43. point d
44. place in loaded configuration
45. place in unloaded configuration
46. run calibration
47. control line ends calibrated
48. calculate control line
49. saves control line
50. line voltages
51. set firing angle/duly cycle to 90°
52. measure motor parameters
53. detects knee
54. decrease firing angle/duly cycle by 2°
55. save phase angle and motor voltage
56. repeat four times
57. compute average values
58. firing angle/duly cycle is increased
59. measure next step
60. fixed voltage clamp
61. synthesize control segment
62. analog to digital converter
63. phase computation
64. phase error is computed
65. voltage error is computed
66. RMS molor voltage is compared to fixed voltage threshold
67. is control target positive
68. voltage loop is run
69. control line loop is run
70. motor placed on dynamometer
71. molor is connected to computer
72. firing angle/duty cycle is increased and voltage decreased
73. record calibration point
74. stari motor
75. firing angle/duty cycle is adjusted
76. form control line
77. differential-lo-single-ended amplifiers
78. input resistors
79. attenuator
80. feedback resistor
81. ground reference resistor
82. protection diodes
83. summing amplifier
84. DC blocking capacitors
85. summing resistors
86. neutral
87. juniper block for alternate neutral connection
88. window comparator
89. motor current is provided
90. positive voltage is provided
91. negative voltage is provided
92. voltage passes through two comparators
93. voltage passes through operation (OR) gale
94. zero-cross digital signal is created
95. current waveform
96. positive voltage half cycle
97. negative voltage half cycle
98. OR function
99. DSP monitors for increase in current
100. increase is observed
101. motor voltage is turned to full on
102. motor voltage is reduced to control line
103. load on the motor
104. power applied to motor
105. point a
106. count sweeps With reference to FIG. 1, a block diagram of a digital signal processor (DSP) 1 and hardware inputs and outputs of the present invention is shown. The DSP 1 can observe the operational characteristics of a motor and make corrections to root mean square (RMS) voltage for the motor that is running and under closed loop control. Hardware inputs 2 capture phase zero crossing inputs 36, phase line voltage 37, phase motor voltage 38 and current 9 and passed through the DSP 1 for processing and then onto power control devices through the power control device outputs 14.

Figure 2:
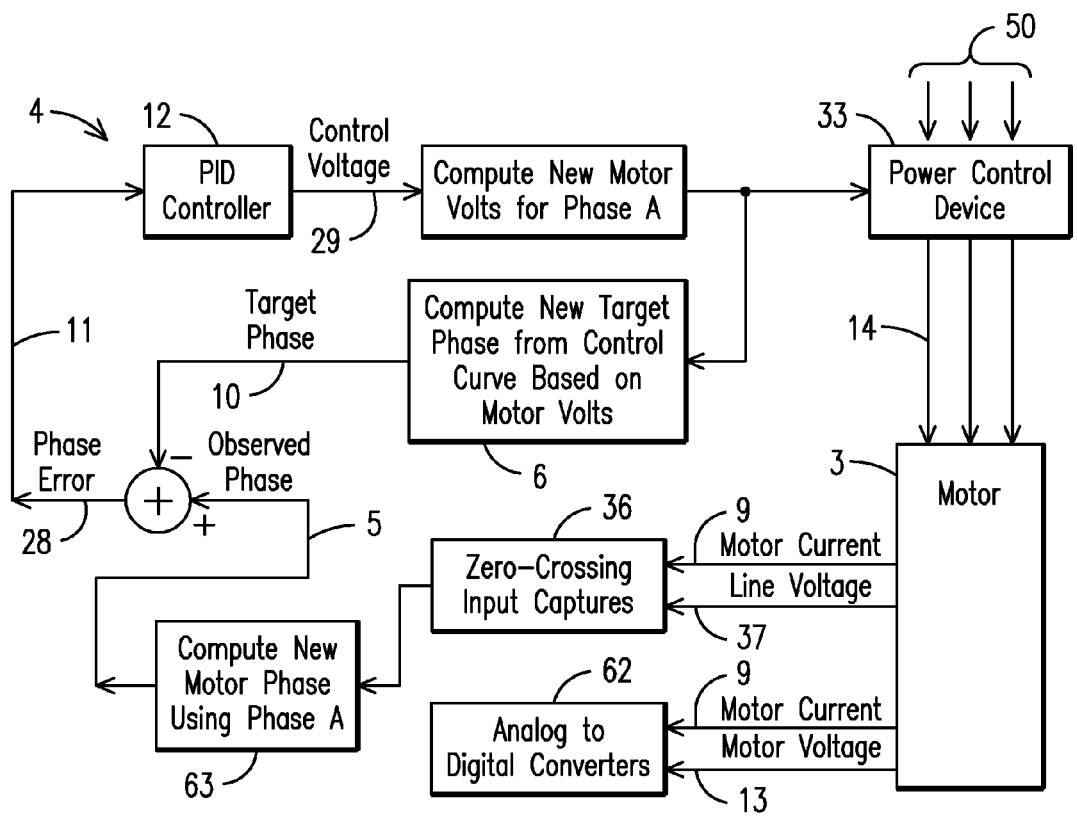
FIG. 2 is a block diagram of a DSP-based motor controller of the present invention.

Referring now to FIG. 2, a block diagram of a system and method of the DSP-based motor controller 4 of the present invention is shown. First, the motor controller 4 reads the voltages 37 of each phase A, B and C and current 9 to capture the zero-crossing inputs 36. At this point voltage 13 and current 9 may be converted from analog to digital using converters 62. Next, computations 63 of motor phase angle for each phase are calculated to yield an observed phase angle 5. Next, a target phase angle 10 which has been derived from a preprogrammed control line 6 is compared to the observed phase angle 5. The difference between the target phase angle 10 and observed phase angle 5 yields a resulting phase error signal 11 which is processed by a digital filter called a proportional integral derivative (PID) controller 12 which has proportional, integral and differential components. The output from the PID controller 12 is the new control voltage 13 to the motor 3, which can be obtained through the use of power control devices 33, such as TRIACs, SCRs, IGBTs or MOSFETS, to yield power control device outputs 14 of RMS motor voltage 13 supplied with line voltages 50 for each phase for maximum energy savings.

In this closed loop system, the voltage 13 of each phase of the motor 3 and the current are continually monitored. The motor controller 4 will drive the observed phase angle 5 to the point on the calibrated control line 6 corresponding to the load that is on the motor. At this point, maximum energy savings will be realized because the control line 6 is based on known calibration data from the motor 3. The motor controller 4 can control the motor 3 just as if a technician set the voltage 13 by hand. The difference is that the DSP 1 can dynamically respond to changes in the load in real-time and make these adjustments on a cycle by cycle basis.

Figure 3:
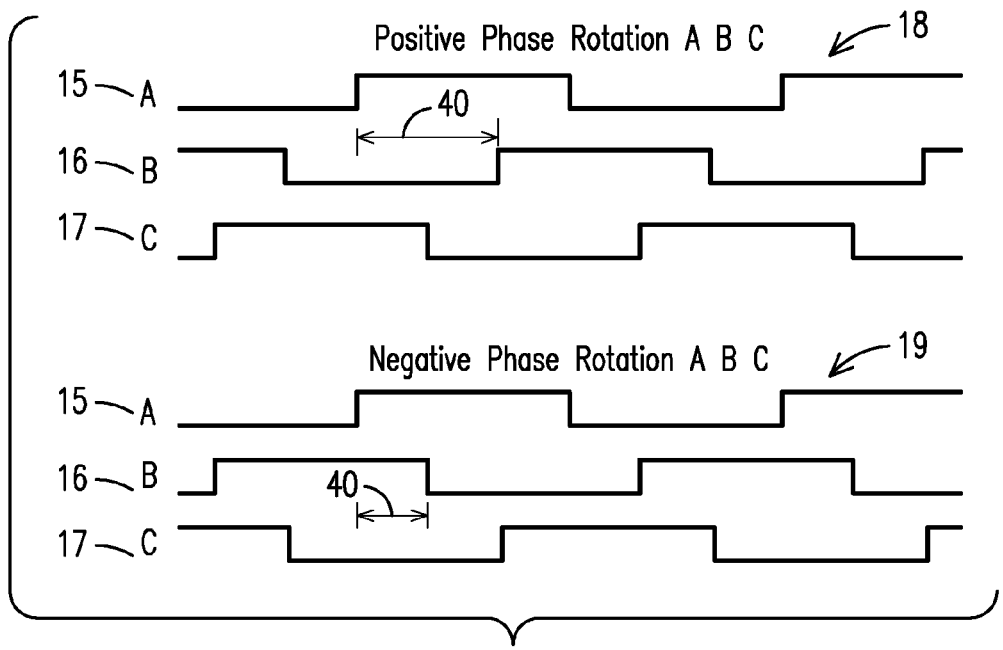
FIG. 3 is a diagram showing a phase rotation detection method of the present invention.

Referring now to FIG. 3, in a three-phase system, the motor controller 4 is used to automatically determine the phase rotation. Zero-crossing detectors on the line voltages provide an accurate measurement of the angle between the phase A line voltage zero crossings 15 and the phase B line voltage zero crossings 16. For positive phase rotation 18, the angle is nominally 120° and for negative phase rotation 19, the angle is nominally 60°.

Figure 4:
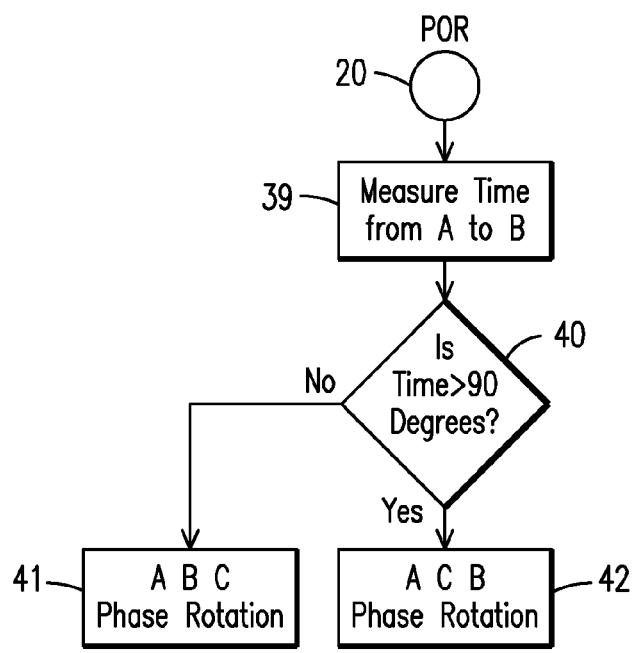
FIG. 4 is a flow chart showing a phase rotation detection method of the present invention.

Referring to FIG. 4, a flow chart for phase rotation detection is shown. After a power-on-reset (POR) 20, it is easy for the motor controller 4 to determine positive phase rotation 18 and the negative phase rotation 19. First, the time is measured from phase A line voltage zero crossings to phase B line voltage zero crossings 39. Next it is determined if the time is greater than or less than 90 degrees 40. If it greater than 90 degrees, than it is an ACB rotation 42. If the time is less than 90 degrees, than it is an ABC rotation 41. The motor controller 4 of the present invention can control three-phase or single-phase motors with the same basic software and hardware architecture. For the three-phase case, depending on the phase rotation, the motor controller 4 can drive power control device outputs 14.

Figure 5:
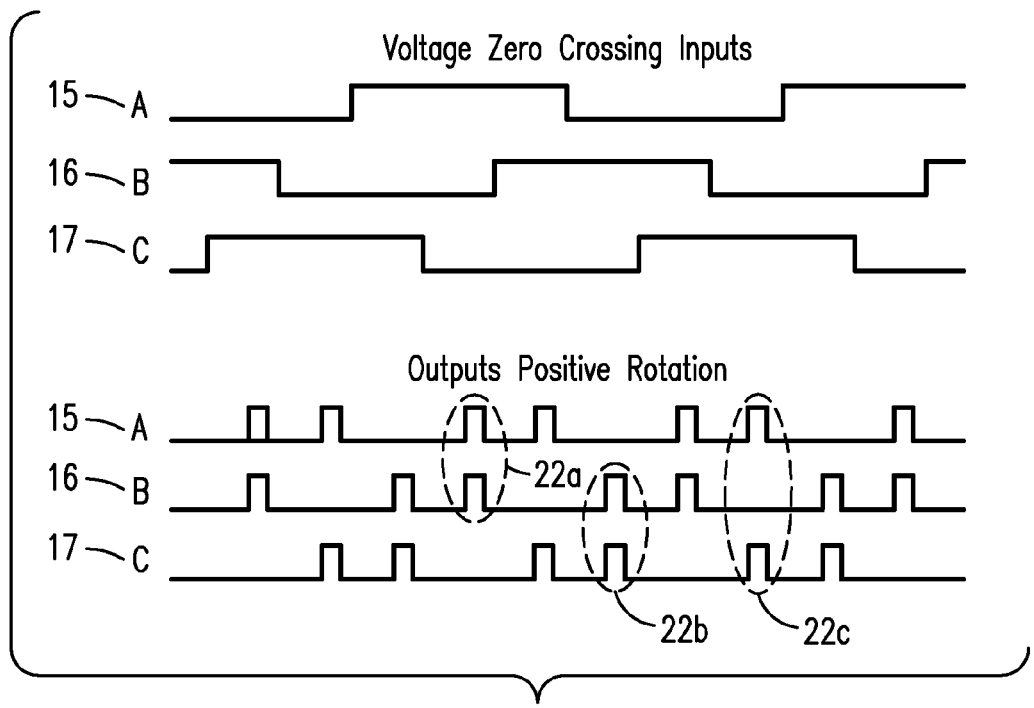
FIG. 5 is a graph showing power control device outputs for positive phase rotation.

Referring now to FIG. 5 which shows power control device outputs for positive drive rotation, the motor controller drives phase A power control device outputs 14 and phase B power control device outputs 14 together during the phase A line voltage zero crossings 15 turn-on time as indicated by the oval 22a. Similarly, the motor controller drives power control devices which drive phase B 16 and phase C power control device outputs 14 together during the phase B turn-on time as indicated by the oval 22b. Finally, the motor controller 4 drives phase C 17 and phase A power control device outputs 14 together during the phase C power control device outputs 14 turn-on time as indicated by the oval 22c. Note that the example shown in FIGS. 5 and 6 depicts a firing angle/duty cycle 23 of 90°.

Figure 6:
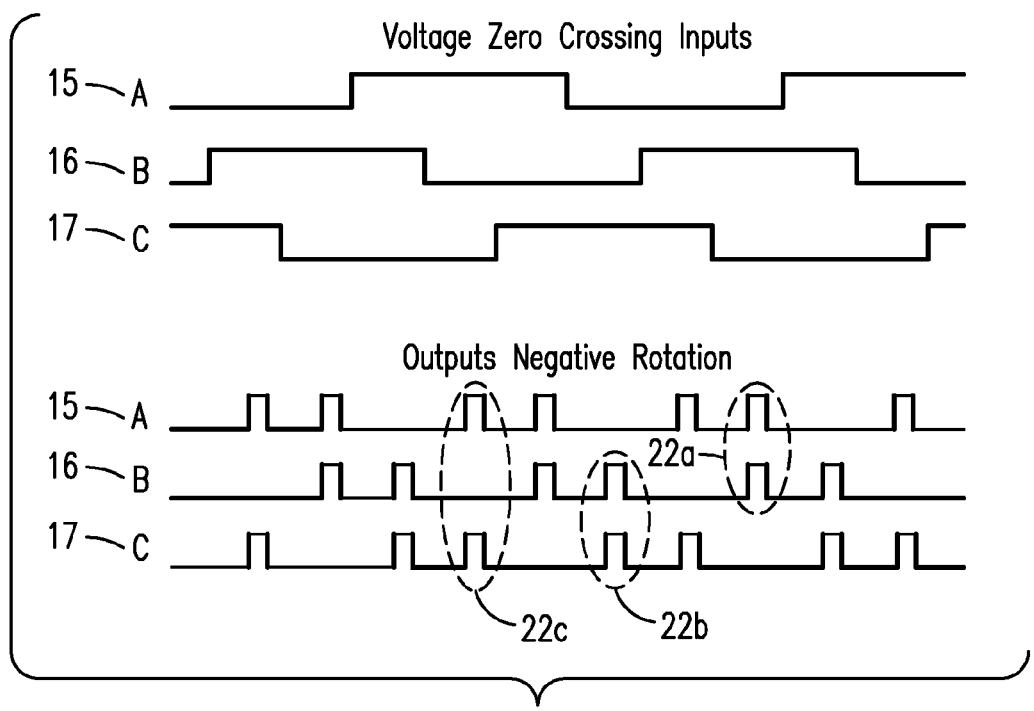
FIG. 6 is a graph showing power control device outputs for negative phase rotation.

Referring now to FIG. 6 which shows the TRIAC drive outputs for negative phase rotation, the motor controller 4 drives phase A power control device outputs 14 and phase C power control device outputs 14 together during the phase A line voltage zero crossings 15 turn-on time as indicated by the oval 22c. Similarly, the motor controller 4 drives phase B 16 and phase A power control device outputs 14 together during the phase B line voltage zero crossings 16 turn-on time, as indicated by oval 22a. Finally, the motor controller drives phase C power control device outputs 14 and phase B power control device outputs 14 together during the phase C line voltage zero crossings 17 turn-on time, as indicated by oval 22b.

Figure 7:
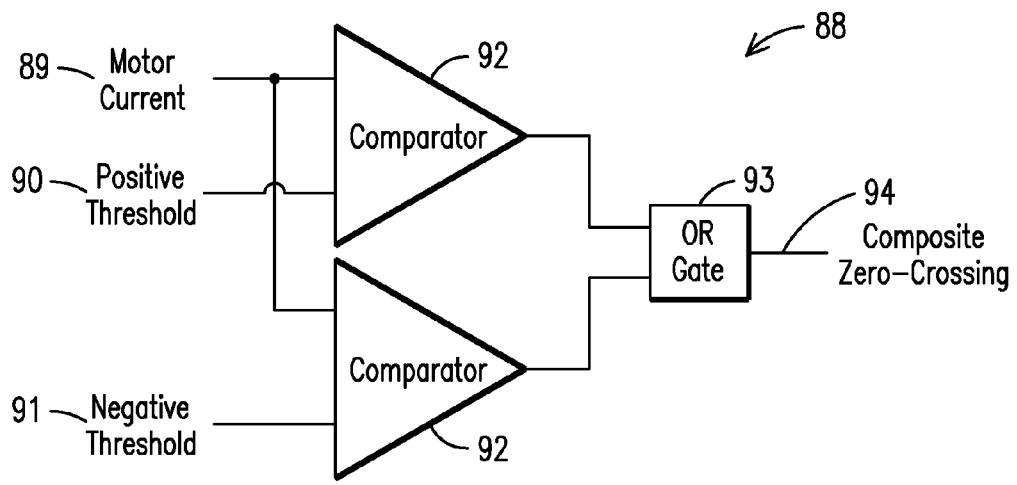
FIG. 7 is a block diagram of a window comparator.

Now referring to FIG. 7, a block diagram of a window comparator is shown. The DSP based motor controller of the present invention uses the window comparator 88 to detect zero-crossings of both positive and negative halves of a current wave form. When RMS motor voltage is reduced by the motor controller, it if difficult to detect zero crossings of current waveform because the current is zero for a significant portion of both half cycles. First, motor current is provided 89, a positive voltage is provided 90 as a reference for a positive half cycle and a negative voltage is provided 91 as a reference. Next, the current, positive voltage and negative voltage are presented to two comparators 92 and are then passed through an operation (OR) gate 93 to create a composite zero-cross digital signal 94.

Figure 8:
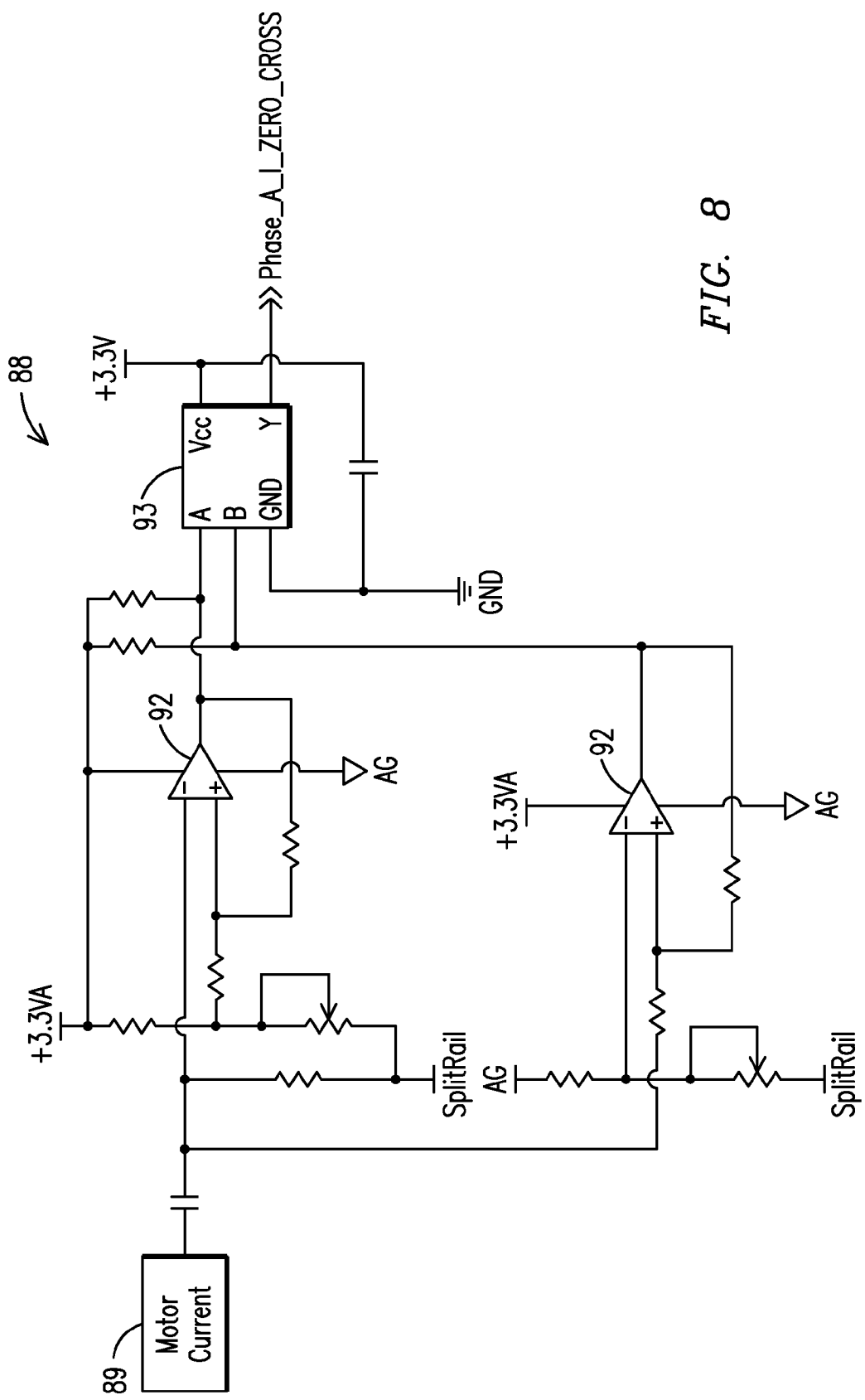
FIG. 8 is a schematic of the window comparator.

As further illustrated in FIG. 8, a schematic of the window comparator 88 is shown. The motor current is provided 89, a positive voltage is provided 90 as a reference for a positive half cycle and a negative voltage is provided 91 as a reference. Next, the current, represented as a positive voltage and negative voltage, is processed by two comparators 92 and are then passed to an OR gate 93 to create a composite zero-cross digital signal 94.

Figure 9:
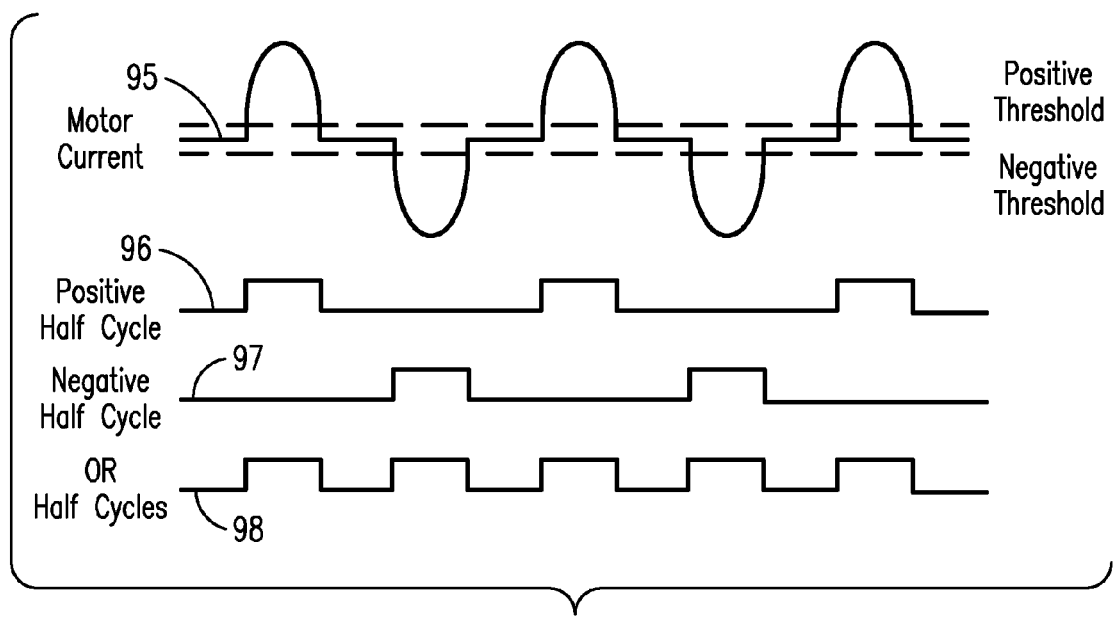
FIG. 9 is a graph of a current waveform and zero-cross signals.

Further, FIG. 9 shows graphs of a current waveform 95, a positive voltage half cycle 96, a negative voltage half cycle 97 and an OR function 98.

Figure 10:
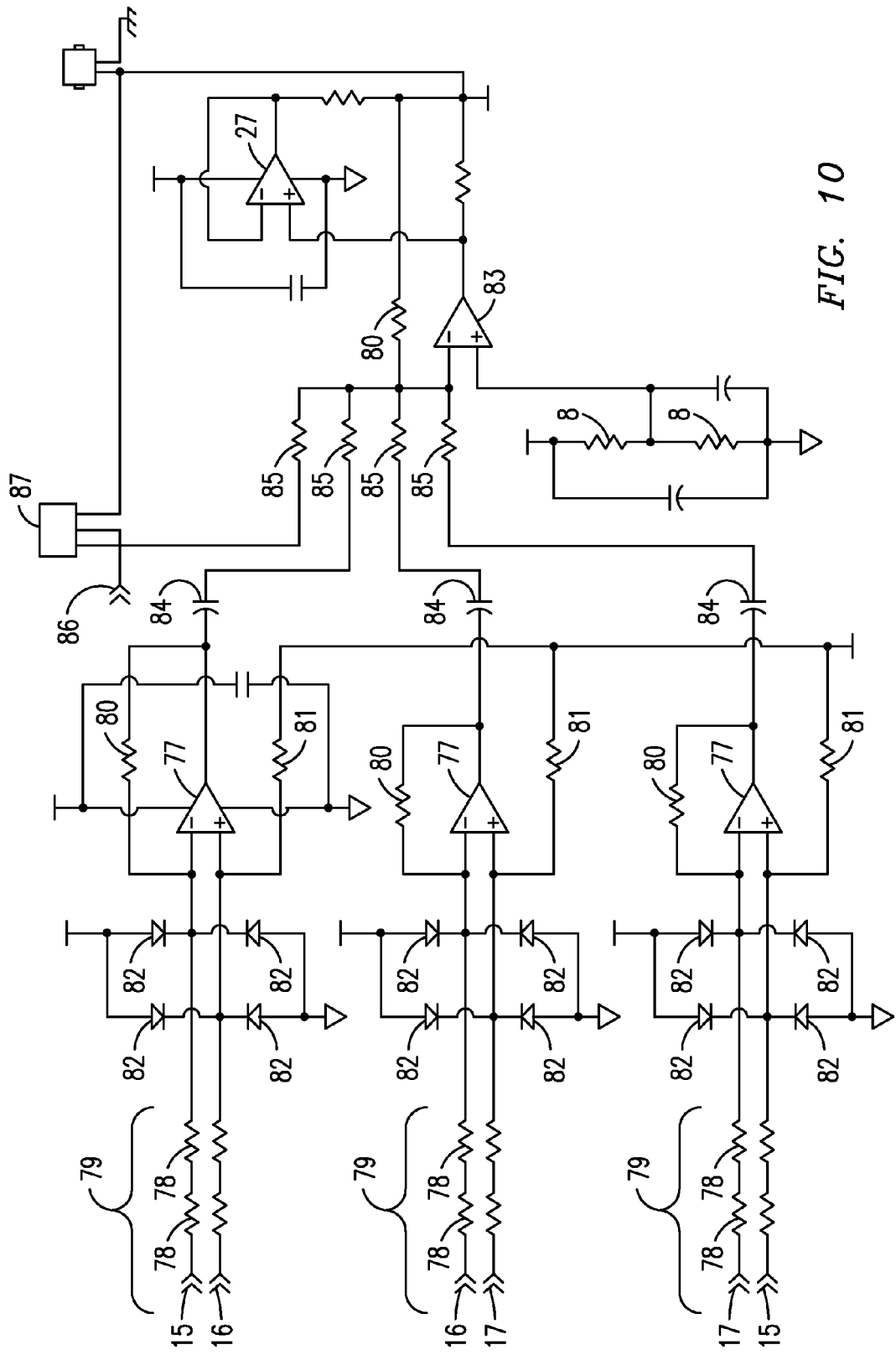
FIG. 10 is a schematic of a virtual neutral circuit.

Now referring to FIG. 10, a schematic of a virtual neutral circuit is shown. A virtual neutral circuit may be used as a reference in situations where three phase power is available only in delta mode and there is no neutral present for use as a reference. The virtual neutral circuit comprises three differential-to-single-ended amplifiers 77. Because phase to phase voltages are high, input resistors 78 are used to form a suitable attenuator 79 together with feedback resistors 80 and ground reference resistors 81. Because the danger exists of a loss of phase, protection diodes 82 are used to protect the differential-to-single-ended amplifiers 77. The differential-to-single-ended amplifiers 77 are coupled to a summing amplifier 83 through DC blocking capacitors 84 and summing resistors 85 together with the feedback resistor 80. The output of of the summing amplifier 83 is boosted by amplifier 27 thereby providing a low impedance output which is at neutral potential. Additional resistors divide a supply rail thereby allowing the summing amplifier 83 to handle alternating positive and negative signals. An alternate connection is available in the event that a neutral 86 is available along with a jumper block for alternate neutral connection 87.

Figure 11:
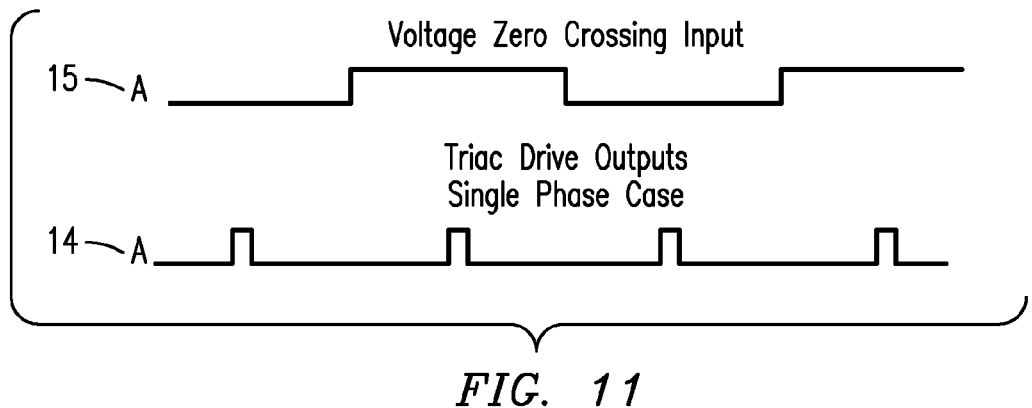
FIG. 11 is a graph showing power control device outputs for single phase applications.

Referring now to FIG. 11 showing a power control device output 14 for a single-phase application, the output 14 for phase A is turned on each half-cycle based on a power control device output 14 derived from the voltage zero-crossing input 15. The power control device output 14 for phase B line voltage zero crossings and phase C line voltage zero crossings are disabled in the DSP 1 and the hardware may not be present. The power control device outputs 14 are not paired as they were in the three-phase case.

Figure 12:
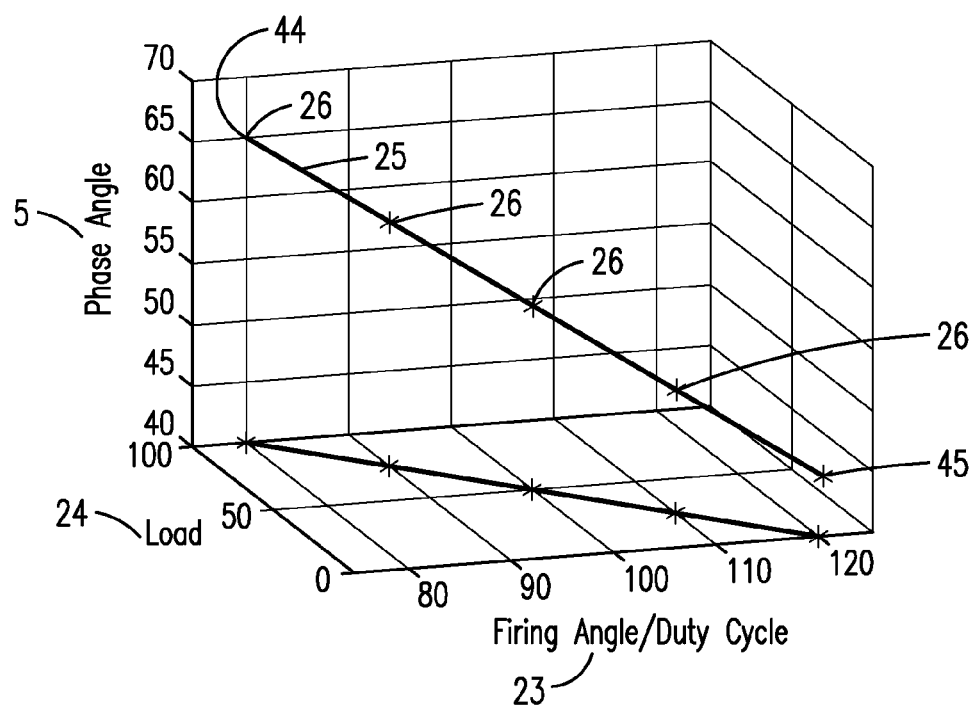
FIG. 12 is a three-dimensional graph showing a three-dimensional control line of the present invention.

Referring now to FIG. 12 which illustrates a three-dimensional control line for the motor operating space of a motor bounded by an observed phase angle 5 on the y-axis. A controlled firing angle/duty cycle 23 showing the decrease in voltage is shown on the x-axis and the percent load 24 on a motor is shown on the z-axis.

Every motor operates along a parametrical control line 25 within its operating space. For example, when a given motor is 50% loaded and the firing angle/duty cycle 23 is set to 100°, a phase angle 5 of approximately 55° is observed.

The parametrical control line 25 shown in FIG. 12 is defined by five parametric operating points 26 ranging from a loaded case 44 in the upper left corner, to an unloaded case 45 in the lower right corner. Furthermore, the parametrical control line 25 has special meaning because it is the line where a motor is using the least energy possible. If the firing angle/duty cycle 23 is increased and the motor voltage 13 decreased then a motor would slow down and possibly stall. Similar results would be seen if the load on the motor 3 is increased.

Figure 13:
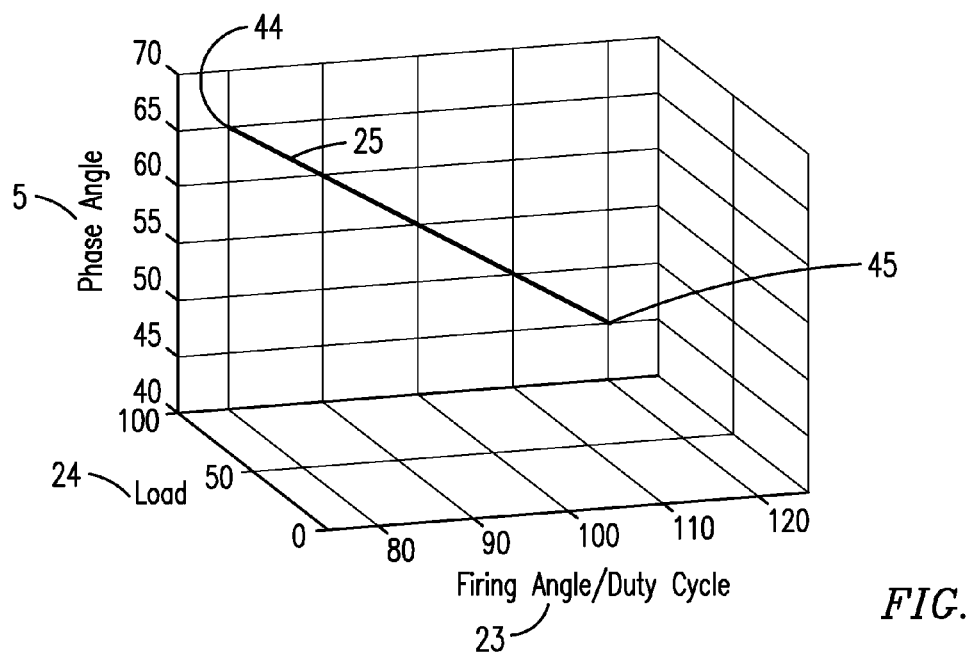
FIG. 13 is a three-dimensional graph showing a control line projected onto one plane.

As illustrated in FIG. 13, the parametric control line 25 may be parameterized and projected onto one plane described by phase angle 5 in the vertical direction and the firing angle/duty cycle 23 in the horizontal direction.

Figure 14:
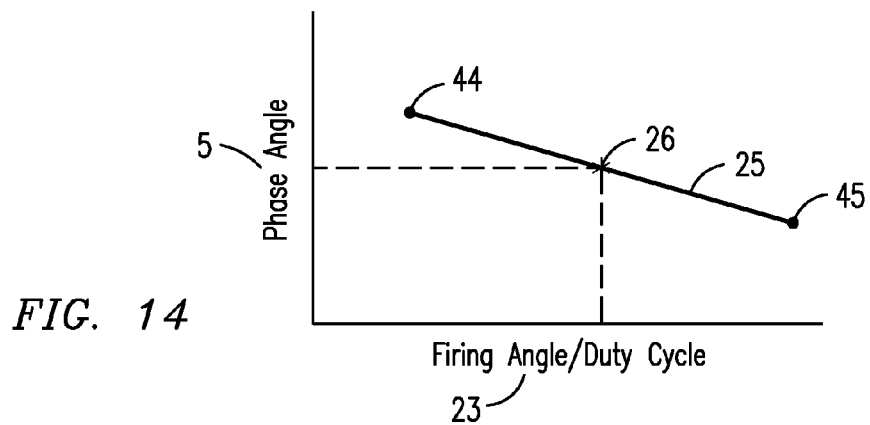
FIG. 14 is a graph showing a two-dimensional plotted control line.

Further, as shown in FIG. 14, the parametrical control line 25 may be displayed on a two-dimensional graph. On the x-axis, increasing firing angle/duty cycle 23 may be equated with a decreasing motor voltage. This is because small firing angle/duty cycles result in high voltage and large firing angle/duty cycles result in low voltage. The motor controller will drive the observed phase angle 5 to the point on the control line 25 that corresponds to the load presently on a motor. To accomplish this, a DSP computes the phase angle 5 between the voltage and current.

Referring back to the block diagram of FIG. 2, the DSP 1 then computes the next target phase angle 5 based on the present value of the RMS voltage 13, or equivalently the present value of the firing angle/duty cycle. The difference between the observed phase angle and the target phase angle 10 results in a phase angle error, which is processed through a proportional-integral-differential (PID) controller 12 or similar device to generate a new control target. This control target changes the voltage in such a way as to minimize the phase angle error. The target phase angle 10 is dynamic and it changes as a function of the firing angle/duty cycle.

As stated above, the motor controller 4 will drive the observed phase angle 5 to the point on the control line 25 that corresponds to the load presently on the motor 3. This operating point 26 provides the maximum energy savings possible because the control line 25 is calibrated directly from the motor 3 that is being controlled.

Figure 15:
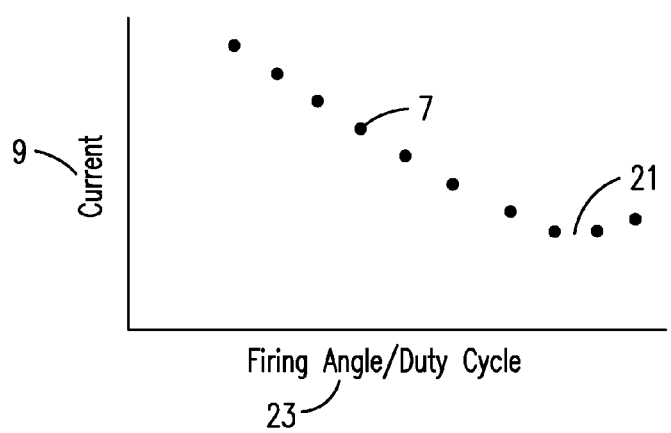
FIG. 15 is a graph showing a sweeping firing angle/duty cycle in a semi-automatic calibration.

This preferred method for calibration is called semi-automatic calibration. The semi-automatic calibration is based on the DSP 1 sweeping the control space of the motor. As shown in FIG. 15, sweeping the control space means that the DSP increases the firing angle/duty cycle 23 and records the current 9 and firing angle/duty cycle 23 of each phase at discrete points along the way. Thus, in this manner it is possible to see the beginning of the stall point 21 of the motor. A well-defined linear portion of observed calibration data curve obtained from sweeping the control space 7, which is used to determine points on the control line 6, has a constant negative slope at lower firing angle/duty cycles 23. Then, as the firing angle/duty cycle 23 continues to increase, the current 9 begins to flatten out and actually begins to increase as the motor 3 begins to slip and starts to stall, called the "knee" 31.

Figure 16:
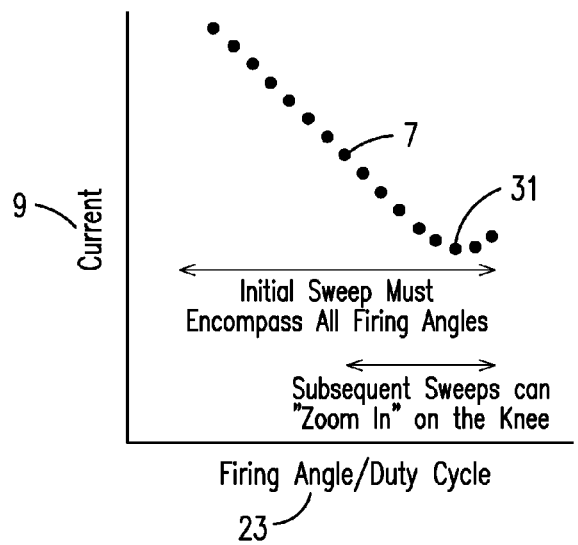
FIG. 16 is a graph showing a directed sweep of a firing angle/duty cycle.

As shown in FIG. 16, subsequent sweeps can be directed at smaller ranges of motor voltages to "zoom in" on the knee. The motor controller 4 requires multiple sweeps in order to get data that is statistically accurate. There is a tradeoff between the number of sweeps and the time required to calibrate the control line 25. A measure of the quality of the calibration can be maintained by the DSP 1 using well known statistical processes and additional sweeps can be made if necessary. This is true because the DSP 1 has learned the approximate location of knee 31 from the first sweep.

There is little danger of stalling during the semi-automatic sweep because of the controlled environment of the setup. A technician or operator helps to insure that no sudden loads are applied to the motor 3 under test while a semi-automatic calibration is in progress.

The process of sweeping the control space can be performed at any fixed load. For example, it can be performed once with the motor 3 fully loaded and once with the motor 3 unloaded. These two points become the two points that define the control line 25. It is not necessary to perform the calibration at exactly these two points. The DSP 1 will extend the control line 25 beyond both these two points if required.

Figure 17:
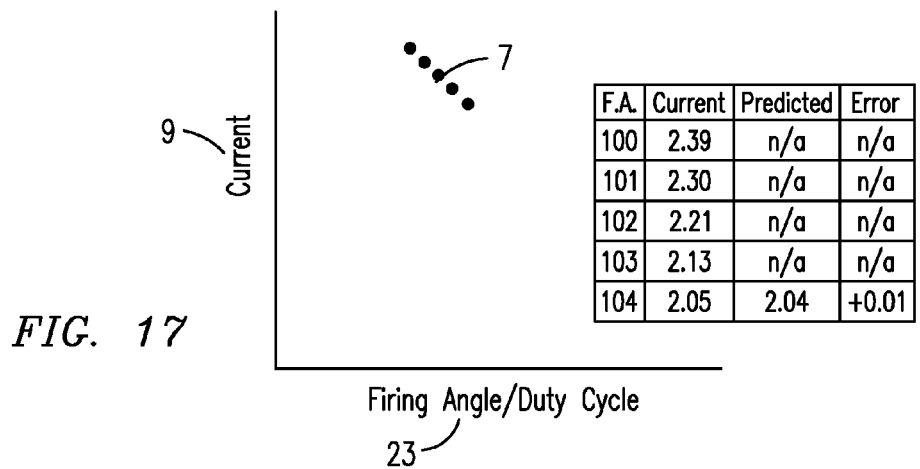
FIG. 17 is a graph showing plotted semi-automatic calibration data.

There are many numerical methods that can be applied to find the stall point 21 in the plot of the current motor voltage 23. As shown in FIG. 17, the preferred method is to use the "least squares" method to calculate a straight line that best fits the accumulated data tabulated from the first five motor voltages 23.

Figure 18:
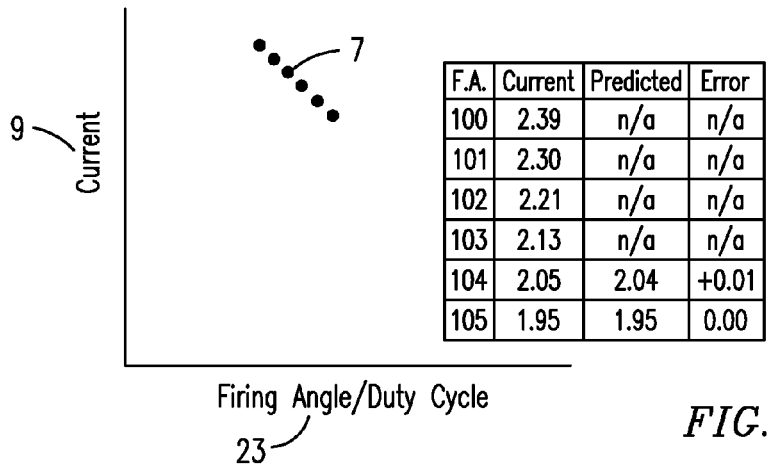
FIG. 18 is a graph showing plotted semi-automatic calibration data.

The continuation of this method is shown in FIG. 18. Using the previous data points the value of the current 9 may be predicted. Graphically, the DSP 1 is checking for one or more points that deviate in the positive direction from the predicted straight line.

Figure 19:
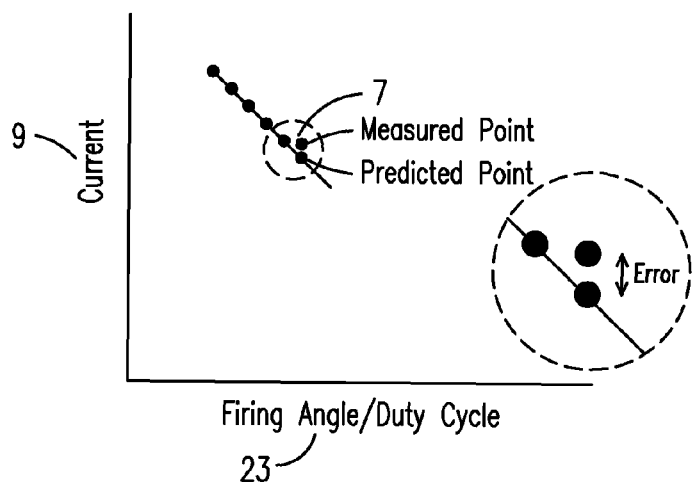
FIG. 19 is a graph showing plotted semi-automatic calibration data.

As shown in FIG. 19, the DSP 1 is looking for the beginning of the knee in the curve. The first point that deviates from the predicted control line may or may not be the beginning of the knee 31. The first point with a positive error may simply be a noisy data point. The only way to verify that the observed calibration data curve obtained from sweeping the control space 7 is turning is to observe data obtained from additional sweeps.

Figure 20:
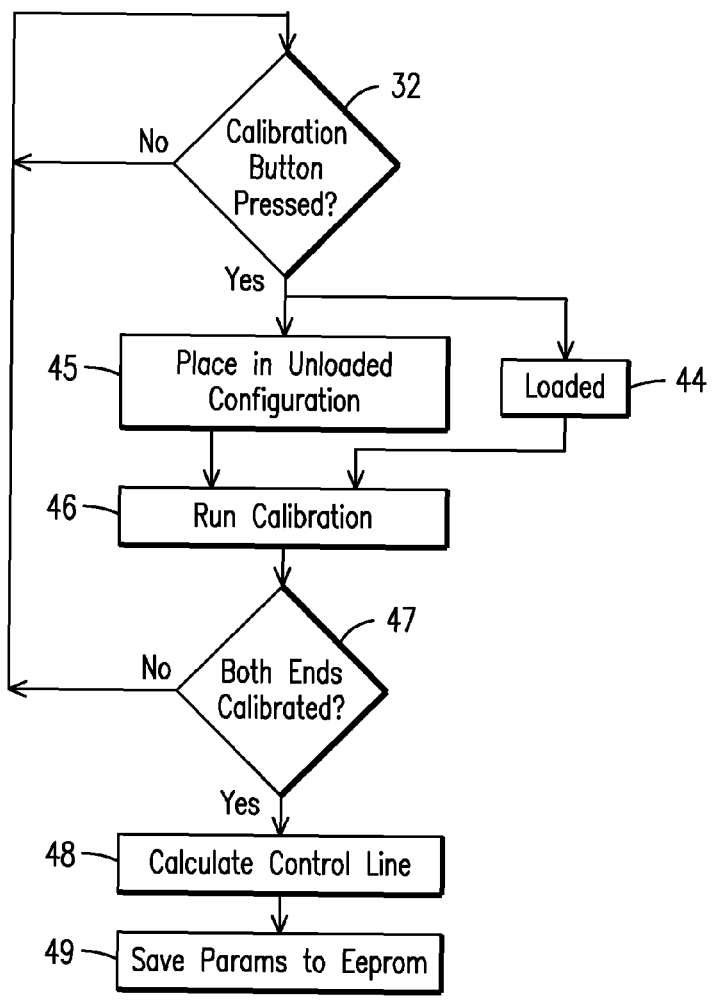
FIG. 20 is a flow chart of a semi-automatic high level calibration.

Semi-automatic calibration may be performed in the field. Referring now to FIG. 20, a flow chart showing how semi-automatic calibration is performed is shown. First the motor 3 is placed in a heavily loaded configuration 44. Ideally this configuration is greater than 50% of the fully rated load. Next a calibration button 32 on the motor controller 4 is pressed to tell the DSP 1 to perform a fully-loaded measurement. The DSP 1 runs a calibration 46 which requires several seconds to explore the operating space of the motor 3 to determine the fully-loaded point. The motor controller 4 indicates that it has finished this step by turning on an LED.

Next the motor 3 is placed in an unloaded configuration 45. Ideally this configuration is less than 25% of the rated load. Then a calibration button 32 on the motor controller 4 is pressed 47 to tell the DSP 1 to perform an unloaded measurement. The DSP 1 runs the calibration 46 to determine the unloaded point. The motor controller 4 indicates that it has finished calibrating both ends 47 of the control line 25 by turning on a light emitting diode (LED). The DSP 1 then determines the control line 48 using the two measurements and applies this control line when it is managing the motor 3. The values of the control line 25 are stored in non-volatile memory 49.

Figure 21:
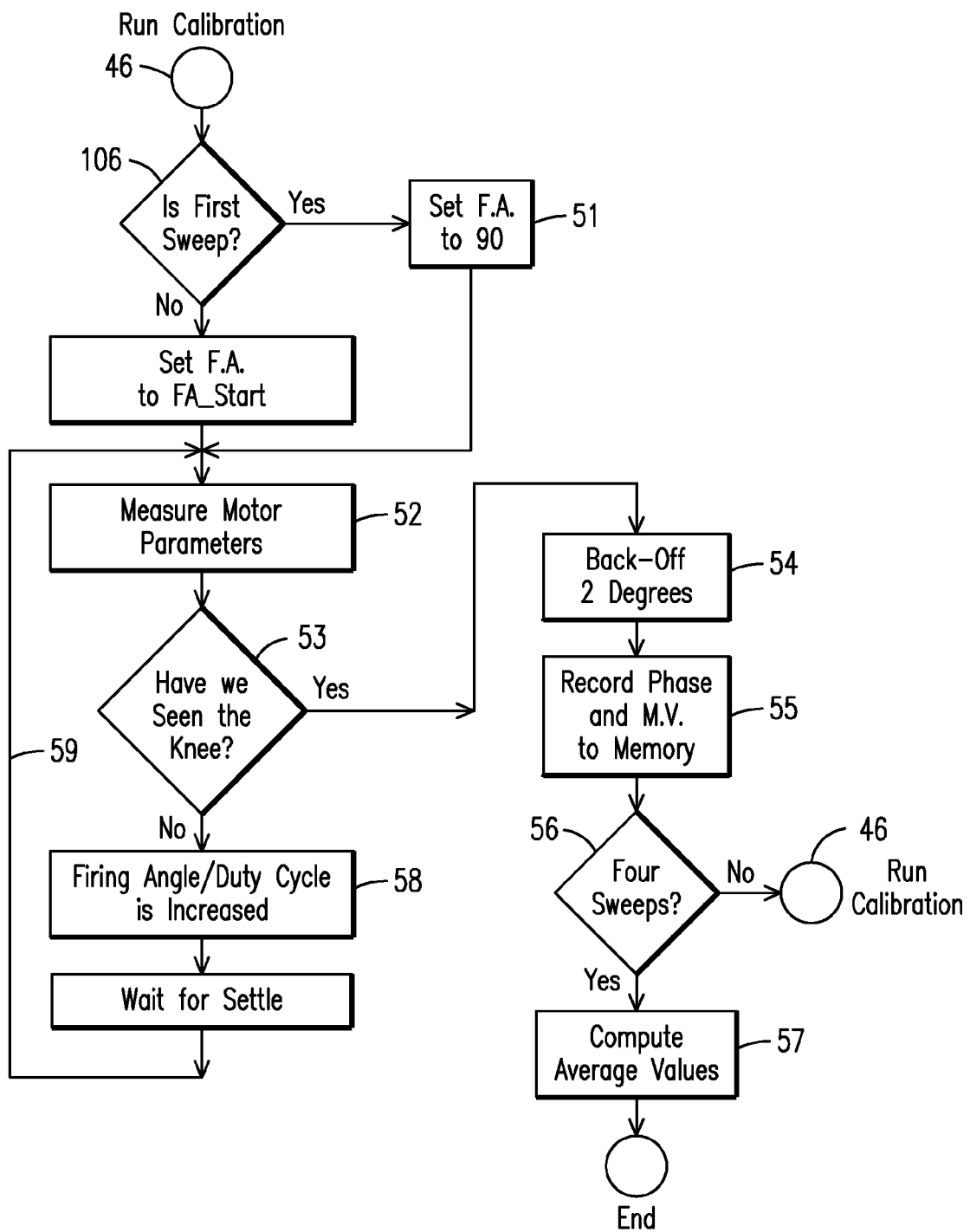
FIG. 21 is a flow chart of a semi-automatic high level calibration.

FIG. 21 shows a more detailed flow chart of the semi-automatic calibration. First a first calibration sweep is run 46 with the motor voltage set at a certain degree 51, depending on if it is a first sweep or previous sweeps have been run 106, in which the motor controller measures the motor 52 until the motor controller detects a knee 53. If a knee 53 is detected the firing angle/duty cycle is decreased by two degrees 54 and the phase angle and the motor voltage are recorded to the memory 55. This process is repeated to obtain at least four sweeps 56 to get a computed average value 57 of the phase angle and the firing angle/duty cycle. If during any step along the calibration sweep, the knee is not detected, then the firing angle/duty cycle is increased by at least one degree 58 and the nest step is measured 59.

Figure 22:
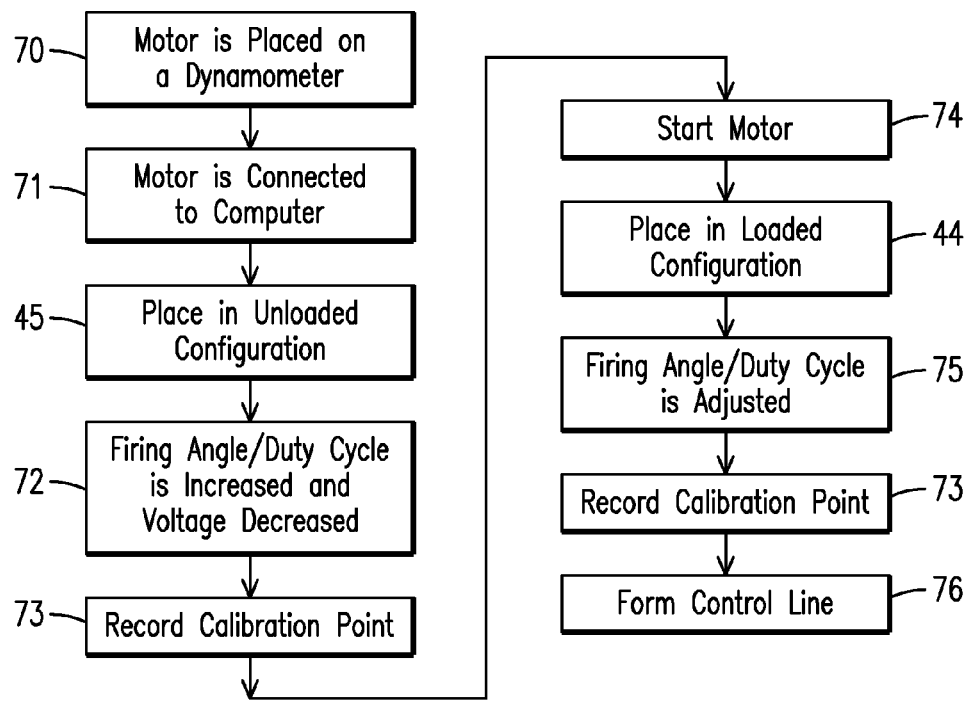
FIG. 22 is a flow chart of a manual calibration.

An alternative method for calibration is called manual calibration. FIG. 22 shows a flow chart of manual calibration. First a motor is placed on a dynamometer 70. Next the motor is connected to a computer for manual control 71 which allows the motor to be run in a open-loop mode and the firing angle/duty cycle of the AC induction motor to be manually set to any operating point. Then the motor is placed in a fully unloaded configuration 45. Next the firing angle/duty cycle is increased and the RMS motor voltage is reduced 72 until the motor is just about to stall. The firing angle/duty cycle and phase angle are recorded and this becomes a calibrated point which is recorded 73. Then the motor is started with drive elements fully on 74. Then the motor is placed in a fully loaded configuration 44. Next the firing angle/duty cycle is increased or decreased until the RMS motor voltage is chopped by the motor controller 75 until the motor is just about to stall. The firing angle/duty cycle are recorded and this becomes another calibrated point which is recorded 73. Finally the two calibrated points are used to form a control line 76.

When the RMS line voltage is greater than a programmed fixed-voltage, the DSP controller clamps the RMS motor voltage at that fixed voltage so energy savings are possible even at full load. For example, if the mains voltage is above the motor nameplate voltage of 115V in the case of a single phase motor then the motor voltage is clamped at 115V. This operation of clamping the motor voltage, allows the motor controller to save energy even when the motor is fully loaded in single-phase or three-phase applications.

Figure 23:
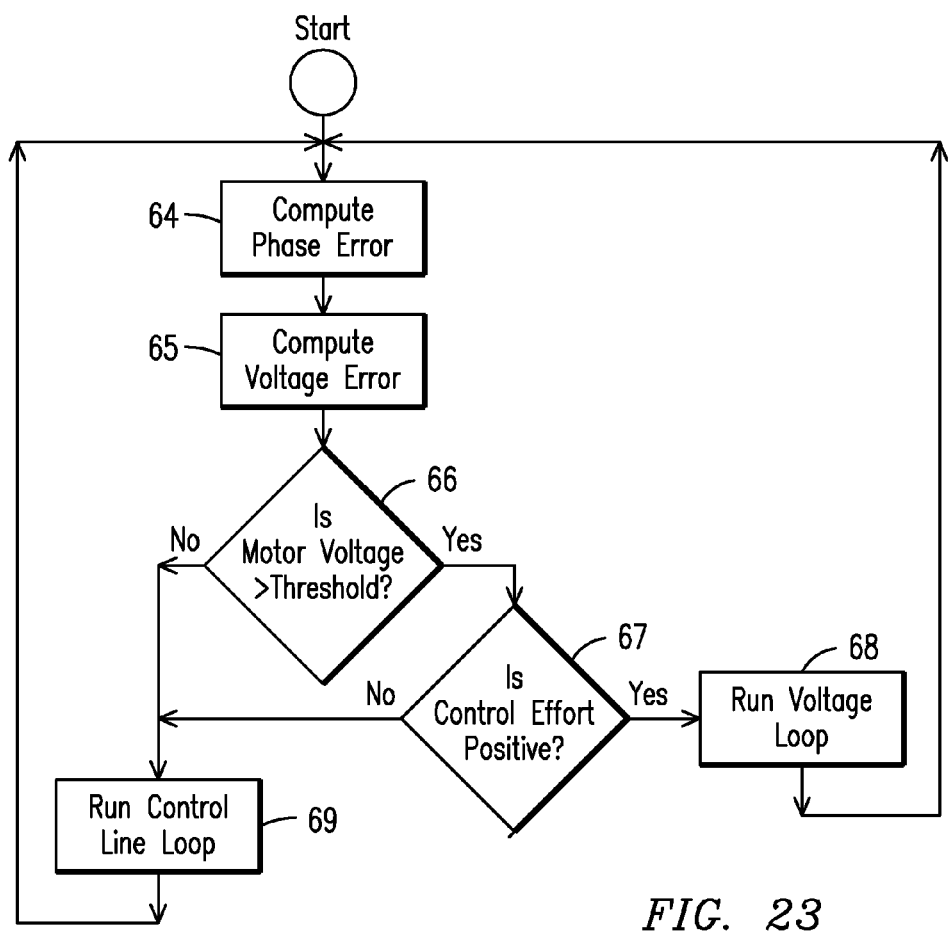
FIG. 23 is a flow chart of a fixed voltage clamp.

FIG. 23 shows a flow chart of the fixed voltage clamp. First a phase error is computed 64. Next a voltage error is computed 65. Then the RMS motor voltage of the AC induction motor is determined and compared to a fixed voltage threshold 66. If the RMS motor voltage is greater than the fixed voltage threshold then it is determined whether or not control target is positive 67. If the control target is positive then a voltage control loop is run 68. If the RMS motor voltage of the AC induction motor is less than a fixed-voltage threshold, then the a control line closed loop is run 69 and the entire process is repeated. If the control target is determined not to be positive then a control line loop is run 69 and the entire process is repeated again.

Figure 24:
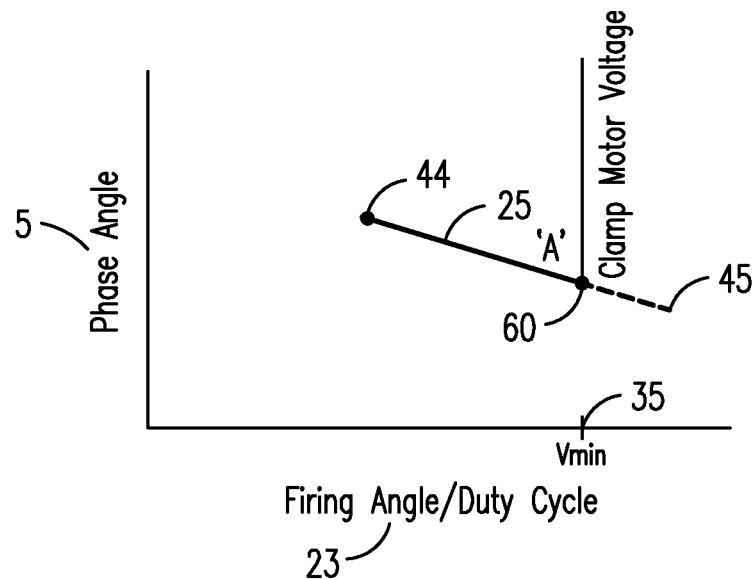
FIG. 24 is a graph showing a RMS motor voltage clamp.

In some cases, it may not be possible to fully load the motor 3 during the calibration process. Perhaps 50% is the greatest load that can be achieved while the motor is installed in the field. Conversely, it may not be possible to fully unload the motor; it may be that only 40% is the lightest load that can be achieved. FIG. 24 shows an example of both load points being near the middle of the operating range. On the unloaded end 45 at the right of the control line 25, the DSP 1 will set the fixed voltage clamp 60 of the voltage at minimum voltage 35. When the load on the motor increases, the DSP 1 will follow the control line moving to the left and up the control segment 61. This implementation is a conservative approach and protects the motor 3 from running in un-calibrated space.

Figure 25:
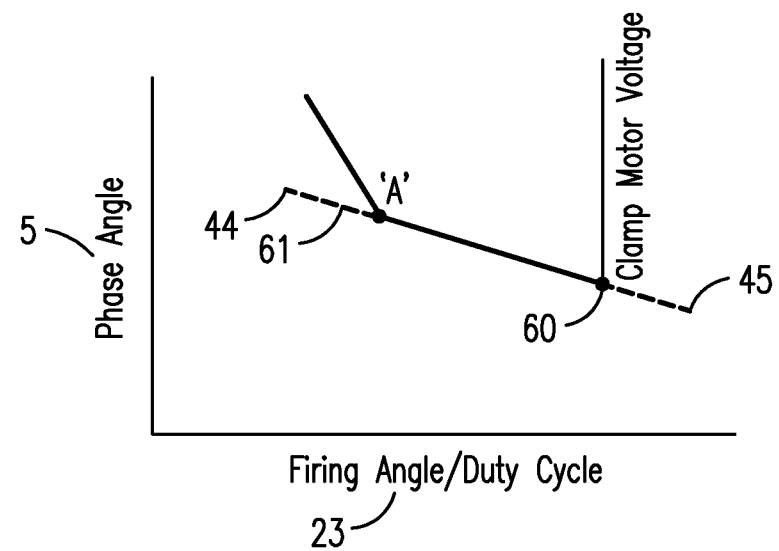
FIG. 25 is a graph showing a RMS motor voltage clamp.

As further shown in FIG. 25, on the fully loaded end 44 at the left, the DSP 1 will synthesize a control segment 61 with a large negative slope. This implementation is a conservative approach and drives the voltage to full-on.

Figure 26:
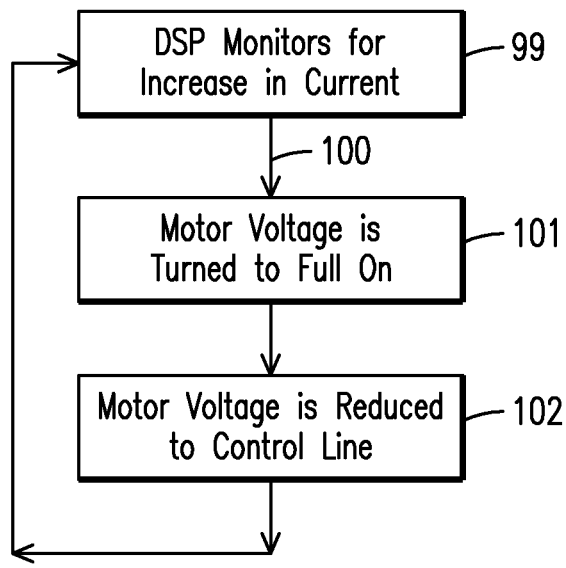
FIG. 26 is a flow chart of a stall mitigation technique.

Referring now to FIG. 26, the DSP-based motor controller uses a special technique to protect a motor from stalling. First, the DSP actively monitors for a significant increase in current 99 which indicates that load on the motor has increased. Next, if a significant increase is observed 100 then the DSP turns motor voltage to full on 101. Next, the DSP will attempt to reduce motor voltage to return to the control 102 and the DSP returns to actively monitoring for a significant increase in current 99. This technique is a conservative and safe alternative to the DSP attempting to track power requirements that are unknown at that time.

Figure 27:
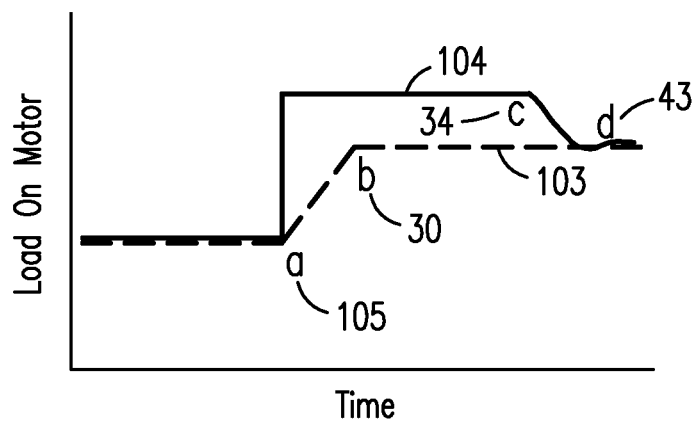
FIG. 27 is a graph showing the stall mitigation technique.

As further shown in FIG. 27, a graph of the stall mitigation technique, the load on the motor is represented on an x-axis and time is represented on a y-axis. The bottom line represents the load on the motor 103 and the top line represents the power applied to the motor by the DSP 104. Prior to point a 105, the DSP is dynamically controlling the motor at a fixed load. In between point a 105 and point b 30, the load on the motor is suddenly increased and the DSP turns the motor voltage to full on. At point c 34, the DSP reduces the motor voltage to point d 43.

Although a preferred embodiment of a motor controller method and system for maximizing energy savings has been disclosed, it should be understood, it is not to be limited to the specific form or arrangement of parts herein described and shown. It will be apparent to those skilled in the art that various changes may be made without departing from the scope of the invention and the invention is not be considered limited to what is shown and described in the specification and drawings.

Having thus described my invention, I claim:

1. A system for controlling an AC induction motor to conserve energy, the system comprising:
    a processor that communicates with a computer-readable non-volatile memory having instructions stored thereon that, when executed by the processor, cause the processor to:
    sweep a control space of said AC induction motor;
    obtain operating parameters of said AC induction motor;
    establish a control line from said measurements;
    receive said control line at said motor controller;
    perform a closed-loop control of said AC induction motor in accordance with said control line to observe an operating parameter;
    drive the observed operating parameter of said AC induction motor relative to said control line, the observed operating parameter comprising a current;
    detect zero-crossings of positive and negative halves of a current waveform of said AC induction motor every cycle by:
        obtaining a positive voltage as a reference for a positive half cycle;
        obtaining a negative voltage as a reference for a negative half cycle; and transmitting signals through an OR gate to create composite current zero-cross digital signals.

2. The system of claim 1, wherein the processor is configured to drive the observed operating parameter of said AC induction motor to correspond to a fully loaded configuration.

3. The system of claim 1, wherein the processor is configured to drive the observed operating parameter of said AC induction motor to correspond to a fully unloaded configuration.

4. The system of claim 1, wherein the processor is further configured to obtain the current of said AC induction motor.

5. The system of claim 4 wherein the processor obtains the current measurement of said AC induction motor in substantially real-time.

6. The system of claim 1 wherein the processor is further configured to obtain phase angles of said AC induction motor.

7. The system of claim 6 wherein the processor obtains the phase angles of said AC induction motor in substantially real-time.

8. The system of claim 1, wherein said observed operating parameter is a phase angle and wherein the processor is further configured to control a firing angle of said AC induction motor.

9. The system of claim 8 wherein the processor controls said firing angle of said AC induction motor in substantially real-time.

10. The system of claim 1 wherein the processor is further configured to sweep the control space of said AC induction motor and measure said operating parameters by automatically varying a root square means motor voltage of said AC induction motor.

11. The system of claim 10, wherein the processor varies the root square means motor voltage of the AC induction motor in substantially real-time.

12. The system of claim 1, wherein the processor establishes said control line from said measurements in substantially real-time.

13. The system of claim 1, wherein the processor receives said control line in said motor controller is from the non-volatile memory.

14. The system of claim 1, wherein the processor performs said closed-loop control of said AC induction motor in substantially real-time.

15. The system of claim 1, wherein the processor is further configured to perform said closed-loop control of said AC induction motor using pulse width modulation.

16. The system of claim 15 wherein:
said pulse width modulation is performed using at least one TRIAC driver.

17. The system of claim 15 wherein:
said pulse width modulation is performed using at least one SCR driver.

18. The system of claim 15 wherein:
said pulse width modulation is performed using at least one IGBT driver.

19. The system of claim 15 wherein:
said pulse width modulation is performed using at least one MOSFET driver.

20. The system of claim 1, wherein the processor is further configured to clamp an operating motor voltage of said AC induction motor at a maximum voltage.

21. The system of claim 1, wherein the processor is further configured to prevent said AC induction motor from running at a voltage below a minimum voltage when monitoring said AC induction motor for a stall point.

22. A system for controlling an AC induction motor to conserve energy, the system comprising:

a processor that communicates with a computer-readable non-volatile memory having instructions stored thereon that, when executed by the processor, cause the processor to:
sweep a control space of said AC induction motor and measuring operating parameters of said AC induction motor;
establish a control line from said measurements;
receive said control line in said motor controller:
perform a closed-loop control of said AC induction motor in accordance with said control line to observe an operating parameter;
drive the observed operating parameter of said AC induction motor relative to said control line;
protect against stalling of said AC induction motor by:
actively controlling said AC induction motor while constantly monitoring said AC induction motor for increases in a motor current;
turning a motor voltage to full on when an increase in said motor current is detected; and
reducing said motor voltage to follow said control line after said motor current decreases.

23. A method for controlling an AC induction motor to conserve energy, the method comprising the steps of:
sweeping a control space of said AC induction motor and measuring operating parameters of said AC induction motor;
establishing a control line for said AC induction motor from said measured operating parameters;
receiving said control line at said motor controller;
performing a closed-loop control of said AC induction motor in accordance with said control line to observe an operating parameter of said AC induction motor after the step of establishing said control line;
driving the observed operating parameter of said AC induction motor relative to said control line;
detecting zero-crossings of positive and negative halves of a current waveform in said AC induction motor every cycle;
obtaining a positive voltage at a window comparator as a reference for a positive half cycle;
obtaining a negative voltage at the window comparator as a reference for a negative half cycle; and
transmitting signals from said window comparator through an OR gate to create composite current zero-cross digital signals.

24. The method of claim 23, wherein the step of sweeping comprises the steps of:
placing the operating parameters of said AC induction motor in a fully loaded configuration;
determining a fully loaded point of said AC induction motor;
placing the operating parameters of said AC induction motor in a fully unloaded configuration; and
determining a fully unloaded point of said AC induction motor.

25. The method of claim 24, further comprising the step of:
connecting the fully loaded point and the fully unloaded point to establish said control line of said AC induction motor.

26. The method of claim 23, further comprising the step of:
automatically recording a motor current and an observed phase angle along said control line.

27. The method of claim 23, further comprising the step of:
controlling a voltage along said control line using pulse width modulation.

28. The method of claim 27 wherein:
said pulse width modulation is performed using at least one TRIAC driver.
29. The method of claim 27 wherein:
said pulse width modulation is performed using at least one SCR driver.
30. The method of claim 27 wherein:
said pulse width modulation is performed using at least one IGBT driver.
31. The method of claim 27 wherein:
said pulse width modulation is performed using at least one MOSFET driver.
32. The method of claim 23, wherein the step of controlling further comprises the step of:
clamping a voltage of said AC induction motor at a minimum voltage to prevent said AC induction motor from running at a voltage below said minimum voltage.
33. A method for controlling an AC induction motor to conserve energy, the method comprising the steps of:
sweeping a control space of said AC induction motor and measuring operating parameters of said AC induction motor;
establishing a control line for said AC induction motor from said measured operating parameters;
receiving said control line at said motor controller;
performing a closed-loop control of said AC induction motor in accordance with said control line to observe an operating parameter of said AC induction motor after the step of establishing said control line;
driving the observed operating parameter of said AC induction motor relative to said control line;
increasing a firing angle/duty cycle of said AC induction motor from eighty degrees to one-hundred-fifty degrees; and
recording a motor current and a phase angle along said control line.
34. A method for controlling an AC induction motor to conserve energy, the method comprising the steps of:
sweeping a control space of said AC induction motor and measuring operating parameters of said AC induction motor;
establishing a control line for said AC induction motor from said measured operating parameters;
receiving said control line at said motor controller;
performing a closed-loop control of said AC induction motor in accordance with said control line to observe an operating parameter of said AC induction motor after the step of establishing said control line;
driving the observed operating parameter of said AC induction motor relative to said control line; and
protecting against stalling of said AC induction motor by:
actively controlling said AC induction motor while constantly monitoring said AC induction motor for increases in a motor current;
turning a motor voltage to full on when an increase in said motor current is detected; and
reducing said motor voltage to follow said control line after said motor current decreases.
35. A motor controller for controlling an AC induction motor to conserve energy, the motor controller comprising:
a processor that communicates with a computer-readable non-volatile memory having instructions stored thereon that, when executed by the processor, cause the processor to:
compute a control line from measured operating parameters;
perform a closed-loop control of the AC induction motor in accordance with said computed control line to observe an operating parameter of the AC induction motor;
drive the observed operating parameter of the AC induction motor relative to said computed control line;
detect zero-crossings of positive and negative halves of a current waveform in the AC induction motor by:
obtaining a positive voltage as a reference for a positive half cycle;
obtaining a negative voltage as a reference for a negative half cycle; and
transmitting signals through an OR gate to create composite current zero-cross digital signals.
36. The motor controller of claim 35 wherein the processor is configured to obtain a current of the AC induction motor.
37. The motor controller of claim 35 wherein the processor is configured to obtain a phase angle of the AC induction motor.
38. The motor controller of claim 35 wherein said observed operating parameter is a phase angle.
39. The motor controller of claim 35, wherein the processor is configured to obtain said operating parameters by varying a root square means motor voltage of the AC induction motor.
40. The motor controller of claim 35, wherein the processor is configured to perform said closed-loop control of the AC induction motor in substantially real-time.
41. The motor controller of claim 35, wherein the processor is further configured to protect against stalling of the AC induction motor.
42. The motor controller of claim 41, wherein the processor is further configured to actively control the AC induction motor while monitoring the AC induction motor for increases in a motor current;
turn a motor voltage to full on when an increase in the motor current is detected; and
reduce the motor voltage to follow said control line after the motor current decreases.

* * * * *